US012388207B2

(12) United States Patent
Nakamura

(10) Patent No.: US 12,388,207 B2
(45) Date of Patent: Aug. 12, 2025

(54) CONNECTOR

(71) Applicant: JAPAN AVIATION ELECTRONICS INDUSTRY, LIMITED, Tokyo (JP)

(72) Inventor: Keisuke Nakamura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 394 days.

(21) Appl. No.: 18/111,081

(22) Filed: Feb. 17, 2023

(65) Prior Publication Data

US 2023/0327351 A1 Oct. 12, 2023

(30) Foreign Application Priority Data

Apr. 11, 2022 (JP) ................................ 2022-065242

(51) Int. Cl.

*H01R 12/71* (2011.01)
*H01R 13/422* (2006.01)
*H01R 13/50* (2006.01)

(52) U.S. Cl.

CPC ......... *H01R 12/716* (2013.01); *H01R 13/422* (2013.01); *H01R 13/50* (2013.01)

(58) Field of Classification Search

CPC .... H01R 12/716; H01R 13/422; H01R 13/50; H01R 13/02; H01R 12/71; H01R 13/42; H01R 13/502

See application file for complete search history.

(56) References Cited

U.S. PATENT DOCUMENTS

| | | | | |
|---|---|---|---|---|
| 5,876,217 A * | 3/1999 | Ito | H01R 13/20 439/74 |
| 5,902,136 A | 5/1999 | Lemke et al. | |
| 6,048,482 A | 4/2000 | Lemke et al. | |
| 6,065,951 A | 5/2000 | Lemke et al. | |
| 6,863,578 B2 | 3/2005 | Templin et al. | |
| 9,276,343 B2 | 3/2016 | Nakamura | |
| 2004/0171285 A1* | 9/2004 | Okura | H01R 12/716 439/74 |

(Continued)

FOREIGN PATENT DOCUMENTS

| | | | |
|---|---|---|---|
| JP | H10134913 A | 5/1998 |
| JP | 2004514296 A | 5/2004 |

(Continued)

*Primary Examiner* — Abdullah A Riyami
*Assistant Examiner* — Nelson R. Burgos-Guntin
(74) *Attorney, Agent, or Firm* — Holtz, Holtz & Volek PC

(57) ABSTRACT

A connector comprises a housing, a plurality of terminals and a plurality of coupling portions. The terminals form two terminal rows. In each of the two terminal rows, the terminals are arranged in a pitch direction perpendicular to a width direction. The terminals of one of the two terminal rows respectively correspond to the terminals of a remaining one of the two terminal rows. Each of the terminals has a press-fit portion, a supporting portion, a contact point and a coupled portion. The supporting portion extends from the press-fit portion. The coupled portion extends from the contact point. Each of the coupling portions is made of insulator. Each of the coupling portions couples the coupled portion of the terminal of the one of the terminal rows with the coupled portion of the corresponding terminal of the remaining one of the terminal rows in a direction perpendicular to the pitch direction.

8 Claims, 18 Drawing Sheets

(56) References Cited

U.S. PATENT DOCUMENTS

| | | | | |
|---|---|---|---|---|
| 2005/0009383 | A1* | 1/2005 | Okura | H01R 12/79<br>439/74 |
| 2012/0028507 | A1* | 2/2012 | Katano | H01R 13/115<br>439/660 |
| 2017/0125930 | A1* | 5/2017 | Komoto | H01R 13/405 |
| 2017/0294737 | A1* | 10/2017 | Horchler | H01R 13/5216 |
| 2019/0173233 | A1* | 6/2019 | Horino | H01R 13/6594 |
| 2019/0181573 | A1* | 6/2019 | Horino | H01R 12/716 |
| 2019/0190209 | A1* | 6/2019 | Horino | H01R 13/6582 |
| 2019/0348782 | A1* | 11/2019 | Horii | H01R 12/737 |
| 2020/0106200 | A1* | 4/2020 | Ishida | H01R 13/6594 |
| 2020/0295511 | A1* | 9/2020 | Shioda | H01R 12/91 |
| 2021/0367362 | A1* | 11/2021 | Yamada | H01R 12/716 |

FOREIGN PATENT DOCUMENTS

| | | | |
|---|---|---|---|
| JP | 2007026964 | A | 2/2007 |
| JP | 2015133202 | A | 7/2015 |
| JP | 6869491 | B2 | 4/2021 |

* cited by examiner

CONNECTOR

CROSS REFERENCE TO RELATED APPLICATIONS

This application is based on and claims priority under 35 U.S.C. § 119 to Japanese Patent Applications No. JP 2022-065242 filed Apr. 11, 2022, the contents of which are incorporated herein in their entirety by reference.

BACKGROUND OF THE INVENTION

This invention relates to a connector comprising terminals which form two terminal rows.

Referring to FIG. 35, JP-A H10-134913 (Patent Document 1) discloses an assembly 990 comprising a connector 900 of this type and a mating connector 950. The connector 900 is mateable in a Z-direction with the mating connector 950 which has mating terminals 952. The connector 900 comprises a housing 910 and a plurality of terminals 920. The housing 910 has two side wall portions 912 and connection portions (not shown). Each of the connection portions connects the two side wall portions 912 with each other so as to maintain a constant distance between the two side wall portions 912 in an X-direction, or in a width direction. The terminals 920 form two terminal rows 930. The two terminal rows 930 are held by the two side wall portions 912, respectively. In each of the two terminal rows 930, the terminals 920 are arranged in a Y-direction, or in a pitch direction.

If, for example, the mating connector 950 is moved relative to the connector 900 in a first orientation of the width direction under a mated state where the connector 900 and the mating connector 950 are mated with each other, one of the mating terminals 952 is pressed against one of the terminals 920 corresponding thereto and belonging to the terminal row 930 which is positioned at a first side of the connector 900 in the first orientation. In this case, there is a possibility that another one of the terminals 920 of the terminal row 930, which is positioned at a second side of the connector 900 in a second orientation opposite to the first orientation of the width direction, is moved away from another one of the mating terminals 952 corresponding thereto and thereby the contact between the terminal 920 of the terminal row 930 at the second side of the connector 900 and the mating terminal 952 corresponding thereto is not maintained. Specifically, a difference between contact force of the terminal 920 at the first side against the mating terminal 952 and contact force of the terminal 920 at the second side against the mating terminal 952 is produced when the mating connector 950 is moved in the width direction relative to the connector 900 under the mated state. Thus, the connector 900 of Patent Document 1 has a drawback that the terminals 920 and the mating terminals 950 might not be in reliable contact with each other in part when the mating connector 950 is moved in the width direction relative to the connector 900 under the mated state.

SUMMARY OF THE INVENTION

It is therefore an object of the present invention to provide a connector which ensures reliable contact between terminals and mating terminals when a mating connector is moved in a width direction relative to the connector under a mated state where the connector and the mating connector are mated with each other.

One aspect of the present invention provides a connector comprising a housing, a plurality of terminals and a plurality of coupling portions. The housing has two side wall portions and a connection portion. The connection portion connects the two side wall portions with each other so as to maintain a constant distance between the two side wall portions in a width direction. The terminals form two terminal rows. The two terminal rows are held by the two side wall portions, respectively. In each of the two terminal rows, the terminals are arranged in a pitch direction perpendicular to the width direction. The terminals of one of the two terminal rows respectively correspond to the terminals of a remaining one of the two terminal rows. Each of the terminals has a press-fit portion, a supporting portion, a contact point and a coupled portion. The press-fit portion is press-fit into the side wall portion. The supporting portion extends from the press-fit portion. The contact point is supported by the supporting portion. The contact point of each of the terminals of the one of the terminal rows faces the contact point of the corresponding terminal of the remaining one of the terminal rows in the width direction. The coupled portion extends from the contact point. Each of the coupling portions is made of insulator. Each of the coupling portions couples the coupled portion of the terminal of the one of the terminal rows with the coupled portion of the corresponding terminal of the remaining one of the terminal rows in a direction perpendicular to the pitch direction.

The connector of the present invention is configured as follows: the connector comprises the plurality of terminals and the plurality of coupling portions each made of insulator; the terminals form the two terminal rows; the terminals of the one of the two terminal rows respectively correspond to the terminals of the remaining one of the two terminal rows; each of the terminals has the coupled portion; and each of the coupling portions couples the coupled portion of the terminal of the one of the two terminal rows with the coupled portion of the corresponding terminal of the remaining one of the two terminal rows in the direction perpendicular to the pitch direction. In other words, the connector of the present invention is configured so that the coupled portion of the terminal of the one of the two terminal rows and the coupled portion of the corresponding terminal of the remaining one of the two terminal rows are coupled with each other in the direction perpendicular to the pitch direction by the coupling portion made of insulator. This enables the connector of the present invention to be configured as follows: in a case where a mating connector is moved relative to the connector in a first orientation of the width direction under a mated state where the connector and the mating connector are mated with each other, one of mating terminals is pressed against one of the terminals corresponding thereto and belonging to the terminal row which is positioned at a first side of the connector in the first orientation; and, in this case, another one of the terminals of the terminal row, which is positioned at a second side of the connector in a second orientation opposite to the first orientation of the width direction, is moved in the first orientation and thereby the contact between the terminal of the terminal row at the second side of the connector and another one of the mating terminals corresponding thereto is also maintained. In other words, the connector of the present invention can ensure reliable contact between the terminals and the mating terminals when the mating connector is moved in the width direction relative to the connector under the mated state where the connector and the mating connector are mated with each other.

An appreciation of the objectives of the present invention and a more complete understanding of its structure may be had by studying the following description of the preferred embodiment and by referring to the accompanying drawings.

Figure 1:
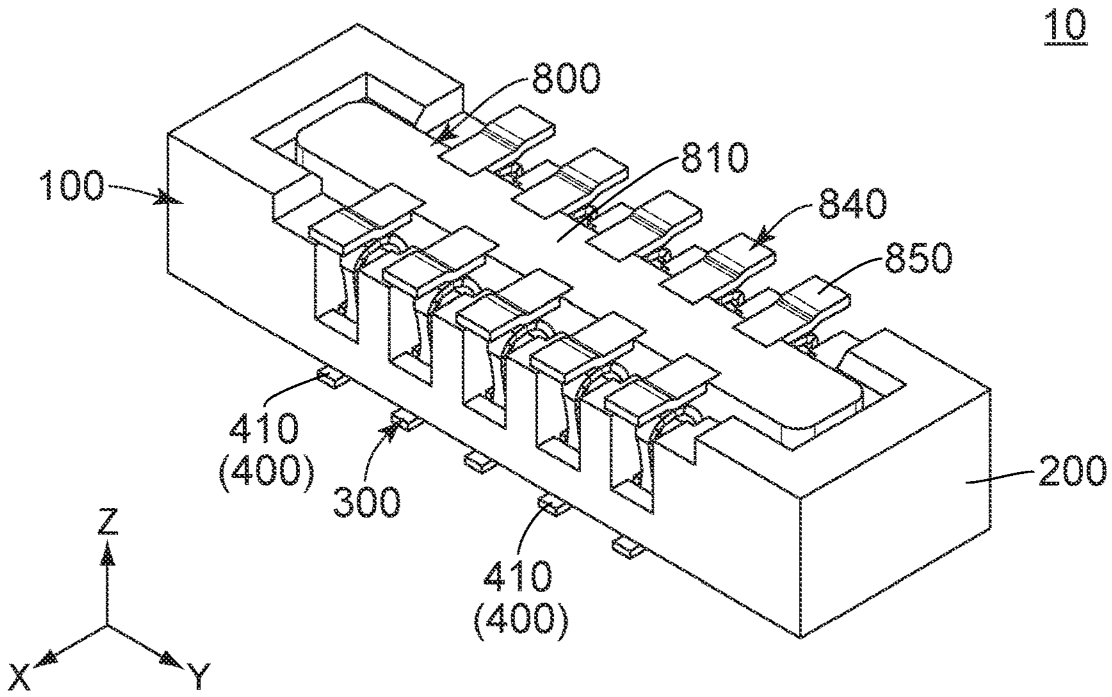
FIG. 1 is a perspective view showing an assembly according to an embodiment of the present invention.
Figure 2:
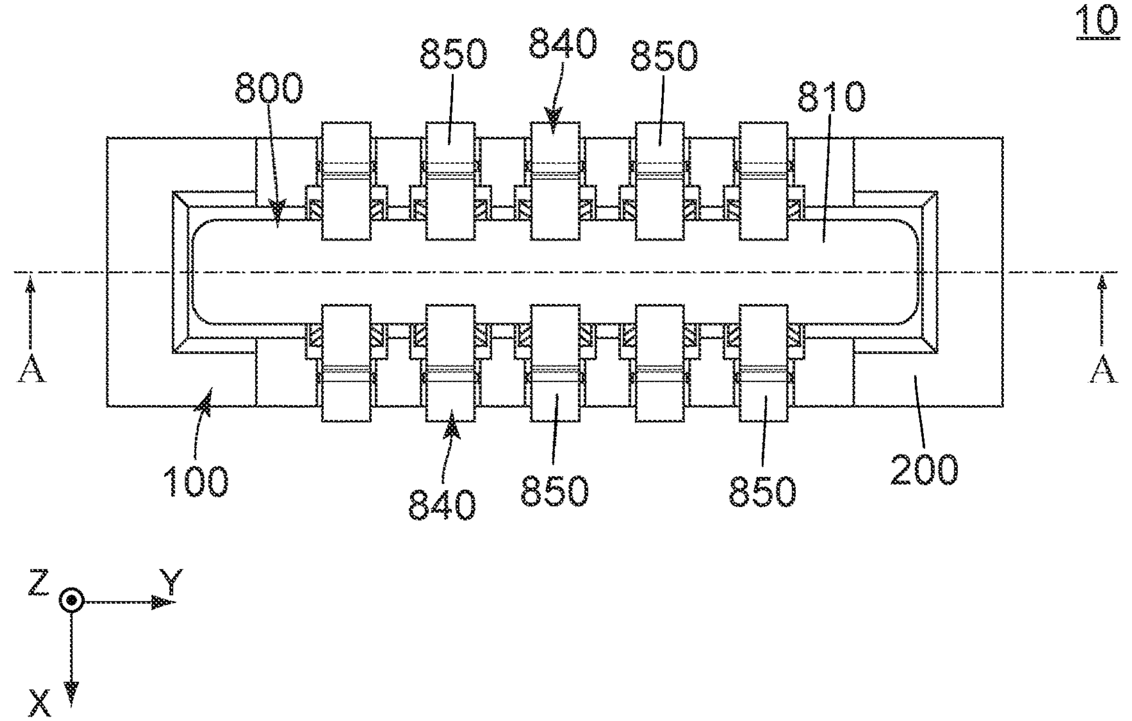
FIG. 2 is a top view showing the assembly of FIG. 1.
Figure 3:
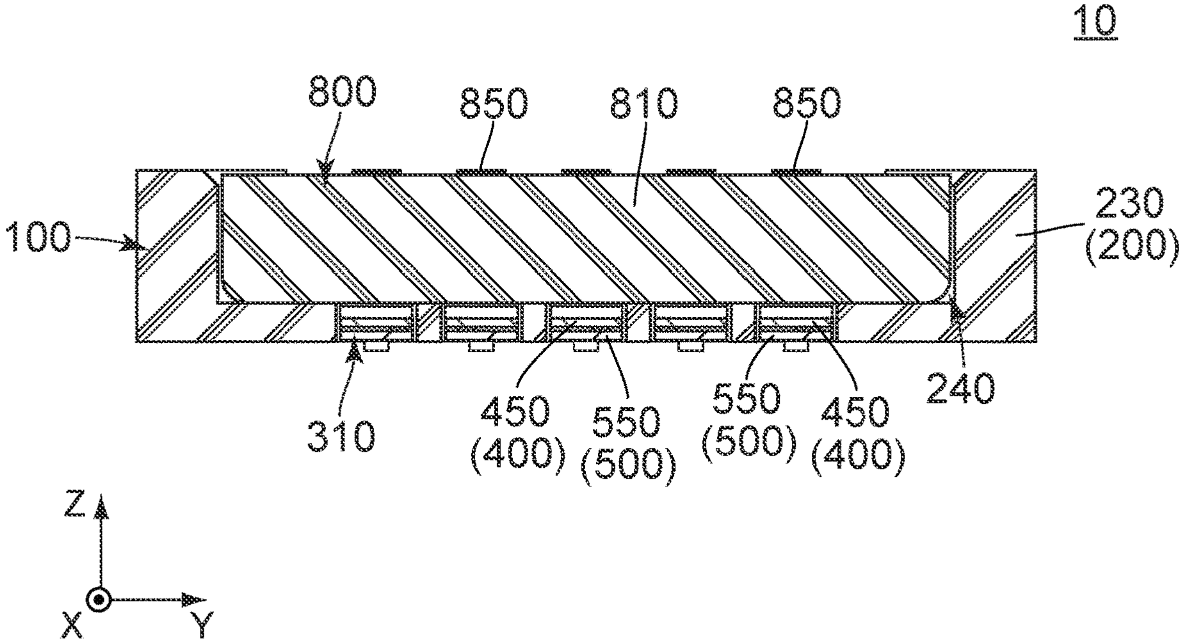
FIG. 3 is a cross-sectional view showing the assembly of FIG. 2, taken along line A-A.
Figure 4:
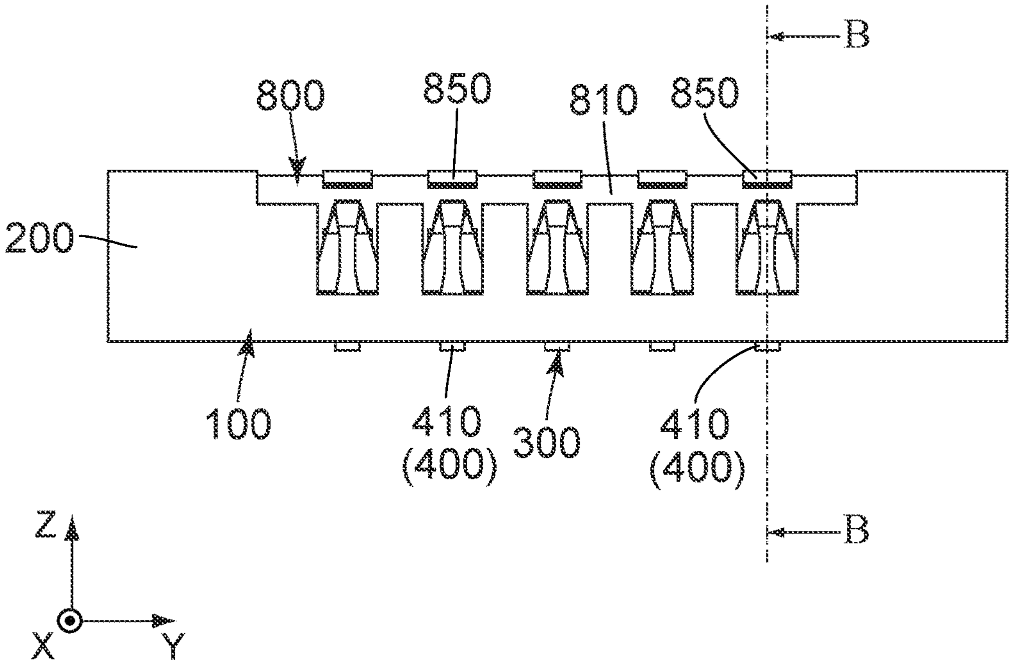
FIG. 4 is a front view showing the assembly of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 5:
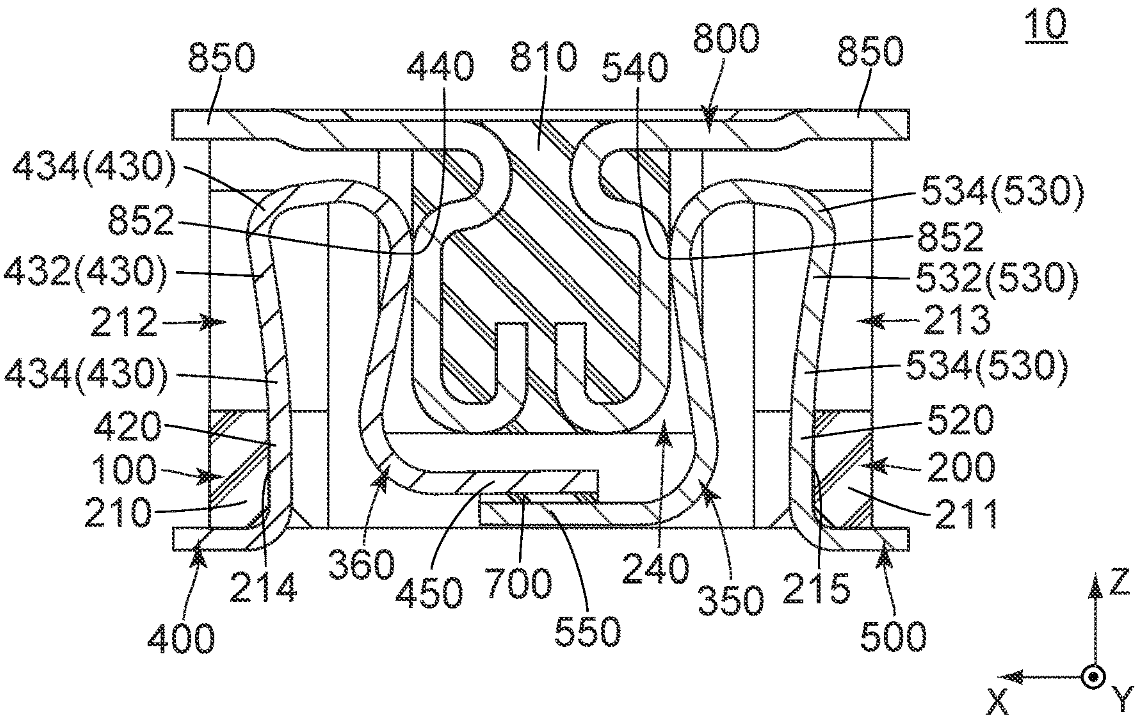
FIG. 5 is a cross-sectional view showing the assembly of FIG. 4, taken along line B-B.

As shown in FIG. 5, an assembly 10 according to an embodiment of the present invention comprises a connector 100 and a mating connector 800.

Referring to FIG. 5, the mating connector 800 is mateable with the connector 100 in an up-down direction. In the present embodiment, the up-down direction is a Z-direction. Specifically, it is assumed that upward is a positive Z-direction while downward is a negative Z-direction.

Figure 32:
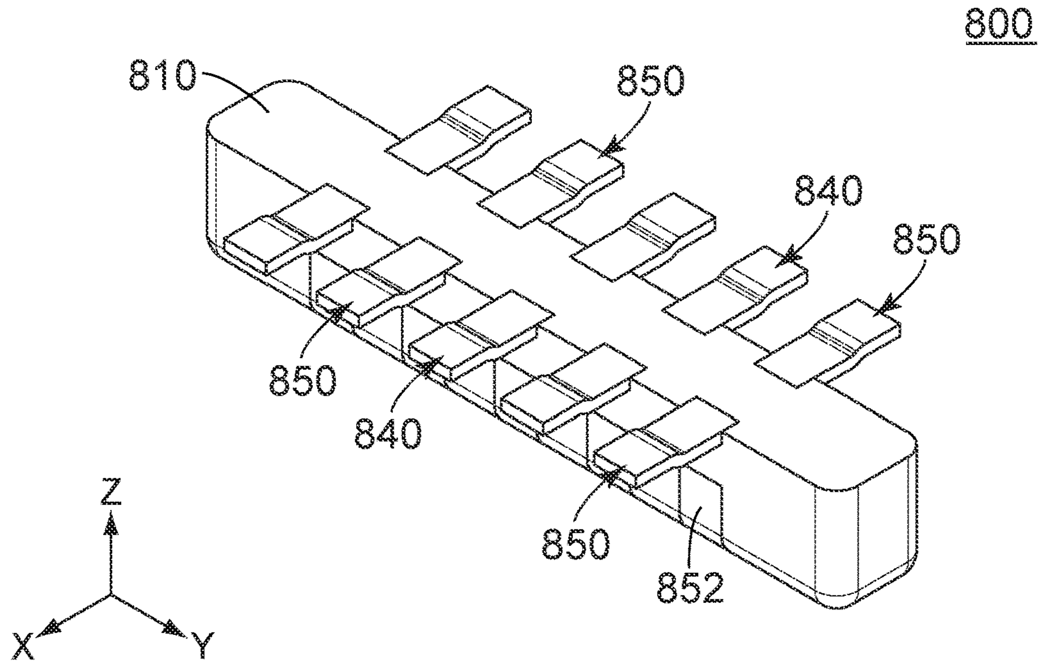
FIG. 32 is a perspective view showing a mating connector which is included in the assembly of FIG. 1.

As shown in FIG. 32, the mating connector 800 of the present embodiment comprises a mating housing 810 and a plurality of mating terminals 850.

Referring to FIG. 32, the mating housing 810 of the present embodiment is made of insulator. The mating housing 810 extends in a pitch direction perpendicular to the up-down direction. In the present embodiment, the pitch direction is a Y-direction.

Figure 33:
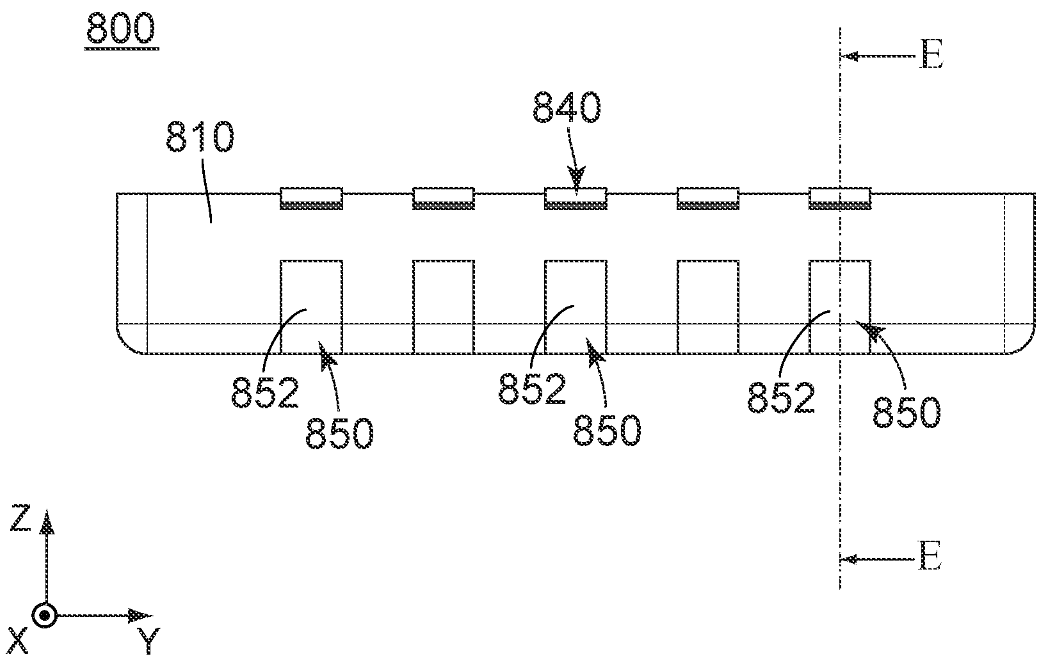
FIG. 33 is a front view showing the mating connector of FIG. 32.

Referring to FIGS. 32 and 33, the mating terminals 850 form two mating terminal rows 840. The two mating terminal rows 840 are arranged in a width direction perpendicular to both the up-down direction and the pitch direction. In the present embodiment, the width direction is an X-direction. The width direction is also referred to as a front-rear direction. Specifically, it is assumed that the forward is a positive X-direction while rearward is a negative X-direction. The two mating terminal rows 840 are held by the mating housing 810. In each of the two mating terminal rows 840, the mating terminals 850 are arranged in the pitch direction. The mating terminals 850 of one of the two mating terminal rows 840 respectively correspond to the mating terminals 850 of a remaining one of the two mating terminal rows 840. In the pitch direction, each of the mating terminals 850 of the one of the mating terminal rows 840 is positioned at a position same as a position of the corresponding mating terminal 850 of the remaining one of the mating terminal rows 840.

Figure 34:
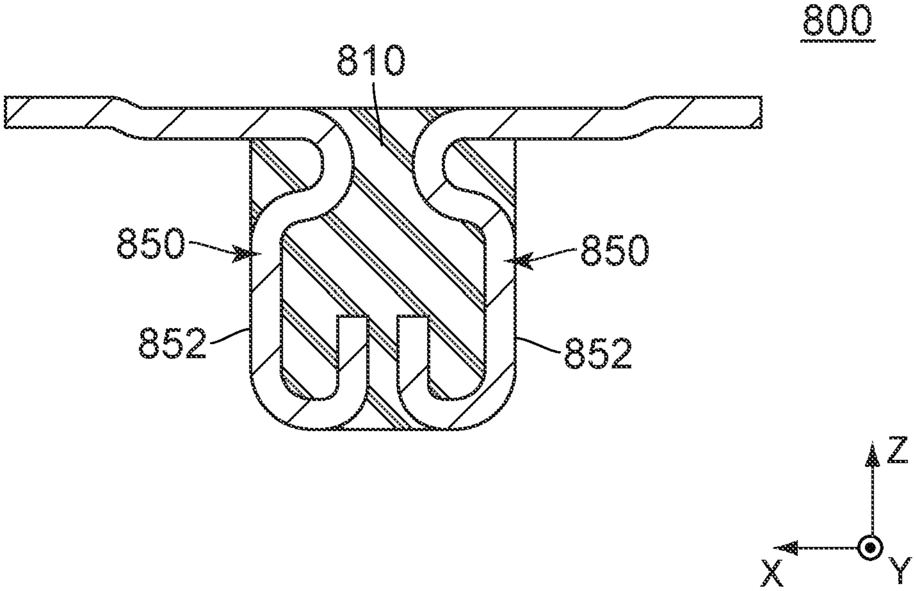
FIG. 34 is a cross-sectional view showing the mating connector of FIG. 33, taken along line E-E.
Figure 35:
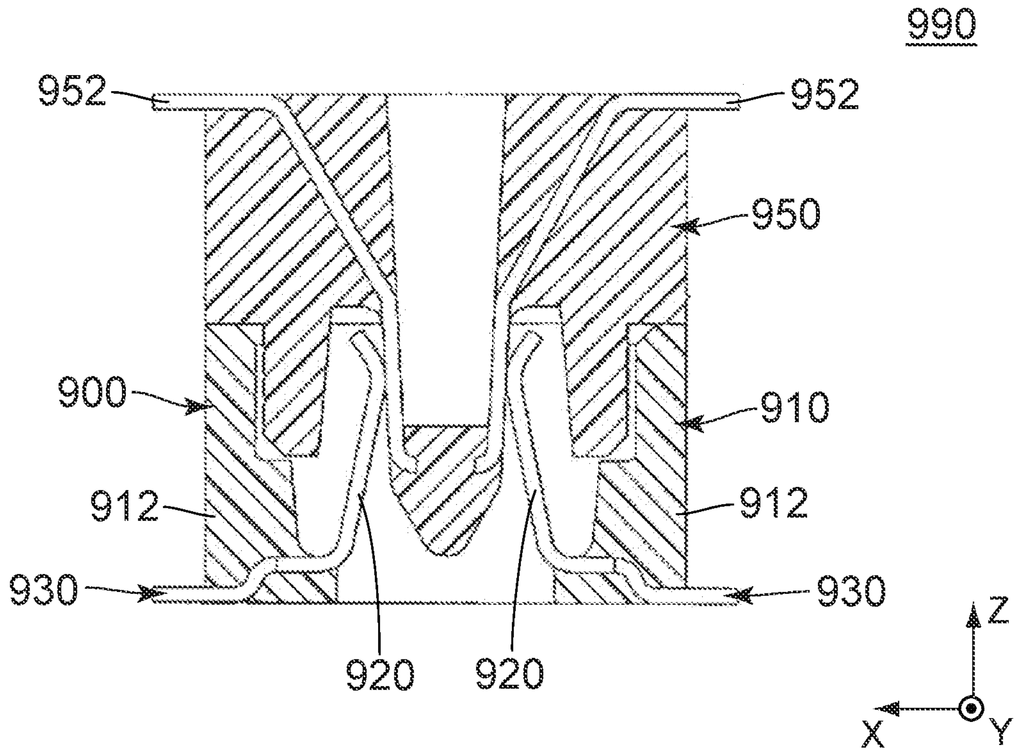
FIG. 35 PRIOR ART
FIG. 35 is a cross-sectional view showing an assembly of Patent Document 1. In the figure, a connector and a mating connector are in a mated state where the connector and the mating connector are mated with each other.

As shown in FIG. 34, each of the mating terminals 850 has a mating contact portion 852. The mating contact portion 852 is exposed from the mating housing 810. The mating contact portion 852 faces outward in the width direction. The mating contact portion 852 is a plane perpendicular to the width direction. The mating contact portion 852 of each of the mating terminals 850 of the mating terminal row 840, which is positioned at a front side of the mating connector 800 in the front-rear direction, faces forward in the front-rear direction. The mating contact portion 852 of each of the mating terminals 850 of the mating terminal row 840, which is positioned at a rear side of the mating connector 800 in the front-rear direction, faces rearward in the front-rear direction.

Figure 11:
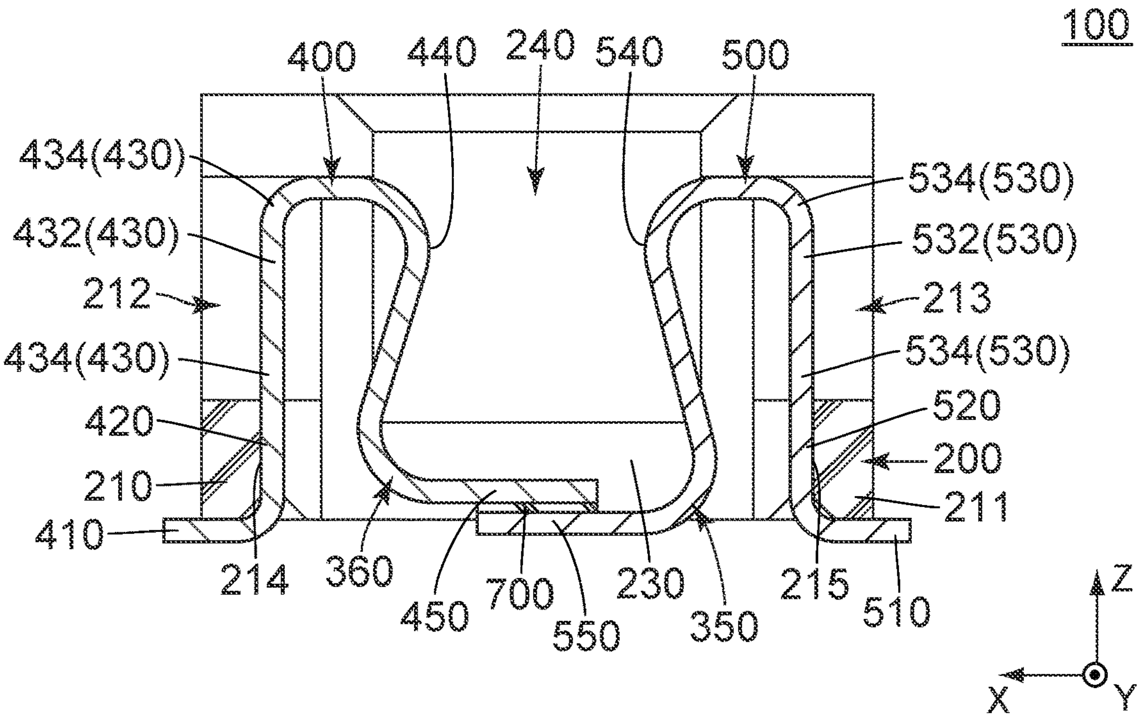
FIG. 11 is a cross-sectional view showing the connector of FIG. 10, taken along line D-D.
Figure 12:
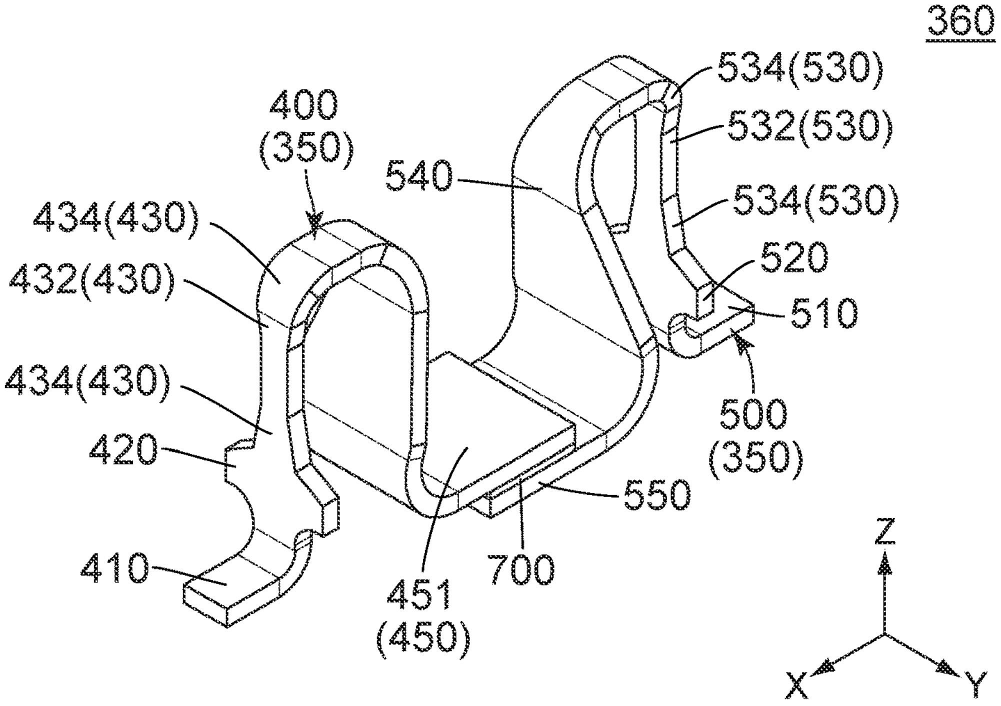
FIG. 12 is a perspective view showing a contact structure which is included in the connector of FIG. 6.

Referring to FIG. 11, the connector 100 of the present embodiment is configured to be mounted on a circuit board (not shown). The connector 100 comprises a housing 200, a plurality of terminals 400, 500 and a plurality of coupling portions 700.

Figure 8:
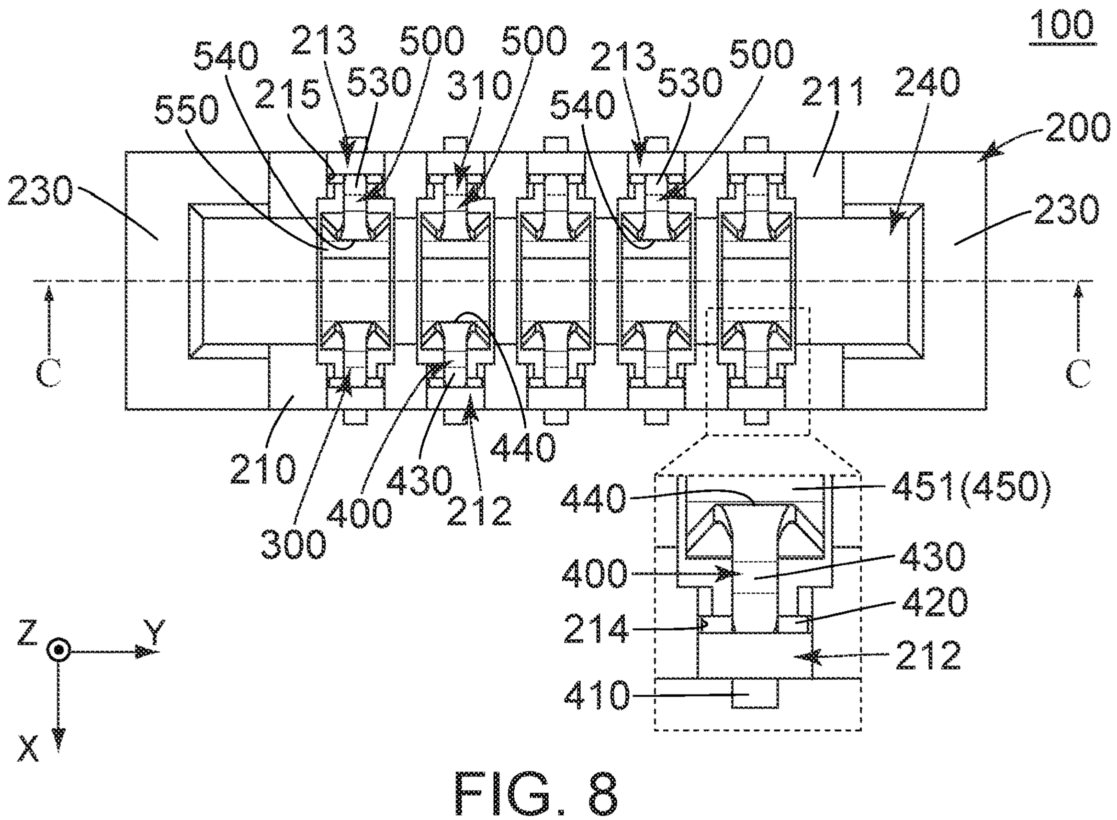
FIG. 8 is a top view showing the connector of FIG. 6.

As shown in FIG. 8, the housing 200 of the present embodiment has two side wall portions 210, 211, two connection portions 230 and a mating connector receiving portion 240. However, the present invention is not limited thereto, but the number of the connection portion 230 may be one. Specifically, the housing 200 should have the two side wall portions 210, 211 and the connection portion 230.

As shown in FIG. 8, each of the side wall portions 210, 211 of the present embodiment extends in the pitch direction. The side wall portions 210, 211 respectively define opposite ends of the housing 200 in the width direction. The two side wall portions 210, 211 are arranged in the width direction, or in the front-rear direction. The side wall portion 210 is positioned forward of the side wall portion 211 in the front-rear direction.

As shown in FIG. 8, the side wall portion 210 has a plurality of receiving portions 212 and a plurality of press-fit parts 214.

Figure 6:
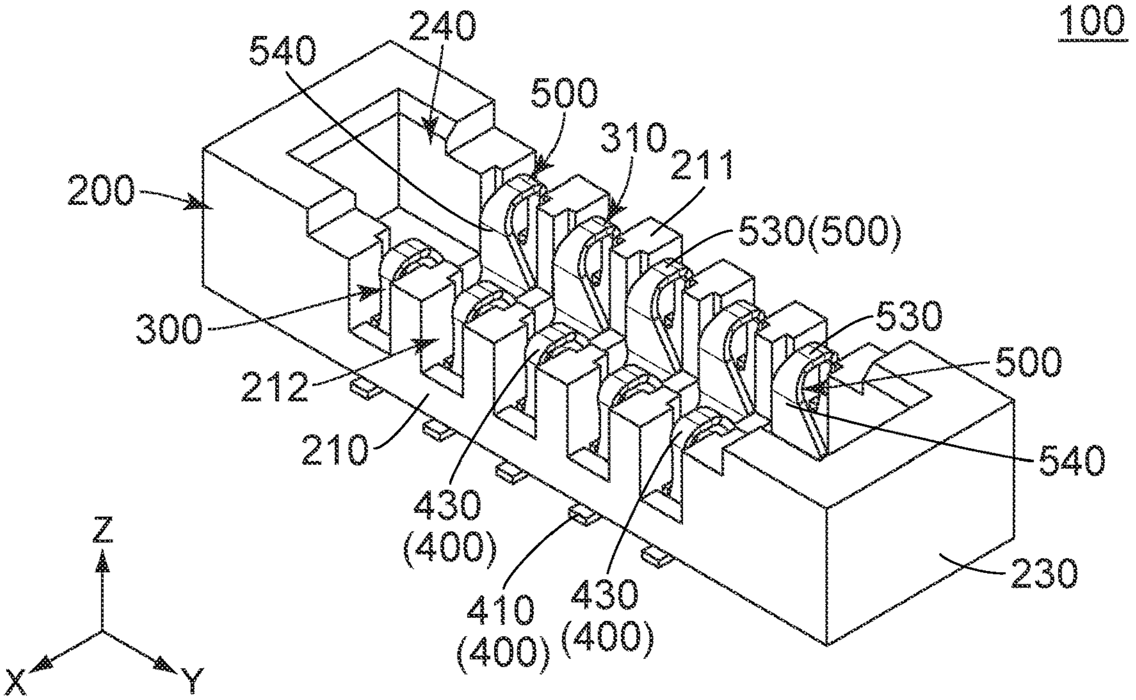
FIG. 6 is an upper, perspective view showing a connector which is included in the assembly of FIG. 1.

Referring to FIGS. 6 and 11, each of the receiving portions 212 of the present embodiment communicates with the outside of the housing 200 in the width direction. The receiving portions 212 correspond to the press-fit parts 214, respectively. Each of the receiving portions 212 is positioned above the corresponding press-fit part 214 in the up-down direction. Each of the receiving portions 212 opens forward in the front-rear direction.

Referring to FIGS. 8 and 11, each of the press-fit parts 214 of the present embodiment is a ditch which pierces the side wall portion 210 in the up-down direction.

As shown in FIGS. 8 and 11, the side wall portion 211 has a plurality of receiving portions 213 and a plurality of press-fit parts 215.

Referring to FIG. 11, each of the receiving portions 213 of the present embodiment communicates with the outside of the housing 200 in the width direction. The receiving portions 213 correspond to the press-fit parts 215, respectively. Each of the receiving portions 213 is positioned above the corresponding press-fit part 215 in the up-down direction. Each of the receiving portions 213 opens rearward in the front-rear direction.

Referring to FIGS. 8 and 11, each of the press-fit parts 215 of the present embodiment is a ditch which pierces the side wall portion 211 in the up-down direction.

As shown in FIG. 8, each of the connection portions 230 of the present embodiment extends in the width direction. The connection portions 230 respectively define opposite ends of the housing 200 in the pitch direction. The two connection portions 230 are arranged in the pitch direction. The connection portions 230 are respectively positioned at opposite ends of the side wall portion 210 in the pitch direction. The connection portions 230 are respectively positioned at opposite ends of the side wall portion 211 in the pitch direction. Each of the connection portions 230 connects the two side wall portions 210, 211 with each other. More specifically, each of the connection portions 230 connects the two side wall portions 210, 211 with each other so as to maintain a constant distance between the two side wall portions 210, 211 in the width direction.

As shown in FIG. 11, the mating connector receiving portion 240 of the present embodiment opens upward in the up-down direction. The mating connector receiving portion 240 is positioned between the side wall portions 210, 211 in the width direction. As shown in FIG. 8, the mating connector receiving portion 240 is positioned between the two connection portions 230 in the pitch direction. As shown in FIG. 5, the mating connector receiving portion 240 receives a part of the mating connector 800 when the connector 100 and the mating connector 800 are mated with each other.

Figure 15:
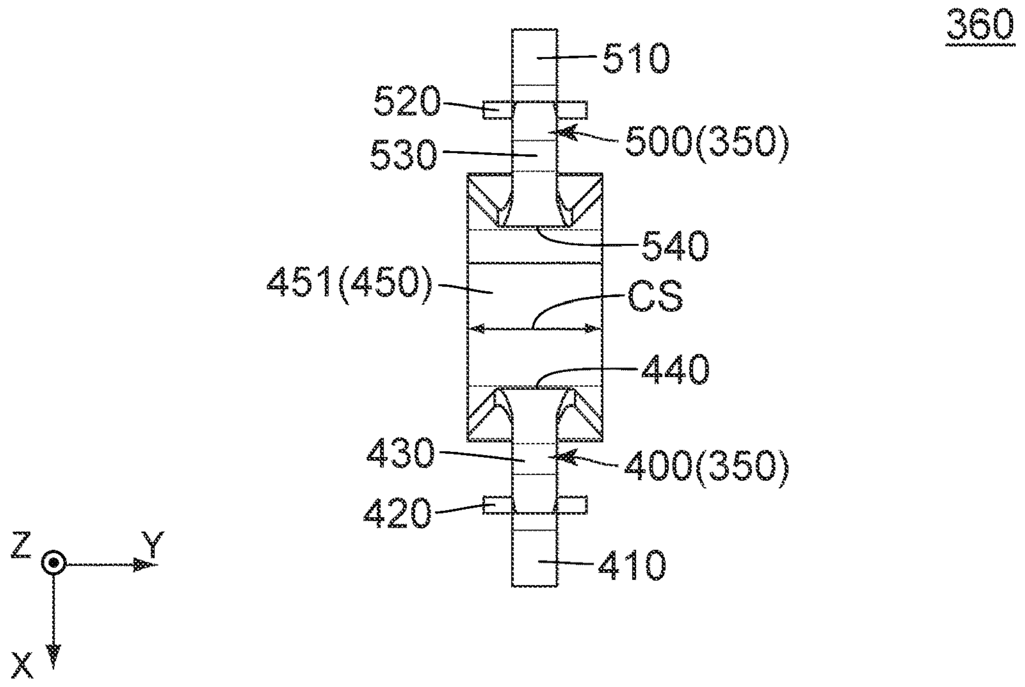
FIG. 15 is a top view showing the contact structure of FIG. 12.

As shown in FIG. 8, the terminals 400, 500 of the present embodiment form two terminal rows 300, 310. Specifically, the terminals 400 of the present embodiment form a terminal row 300 while the terminals 500 of the present embodiment form a terminal row 310. The two terminal rows 300, 310 are arranged in the width direction, or in the front-rear direction. The terminals 400 of the terminal row 300 are arranged in the pitch direction perpendicular to the width direction. The terminals 500 of the terminal row 310 are arranged in the pitch direction perpendicular to the width direction. The terminal row 300 is held by the side wall portion 210 while the terminal row 310 is held by the side wall portion 211. The terminals 400 of one of the two terminal rows 300, 310, or of the terminal row 300, respectively correspond to the terminals 500 of a remaining one of the terminal rows 300, 310, or of the terminal row 310. Referring to FIGS. 8 and 15, the terminal 400 of the one of the terminal rows 300, 310, or of the terminal row 300, and the corresponding terminal 500 of the remaining one of the terminal rows 300, 310, or of the terminal row 310, form a terminal pair 350. In the pitch direction, the terminal 400 of the one of the terminal rows 300, 310, or the terminal row 300, is positioned at a position same as a position of the corresponding terminal 500 of the remaining one of the terminal rows 300, 310, or the terminal row 310. That is, in each of the terminal pairs 350, the two terminals 400 and 500 are positioned at the same position as each other in the pitch direction. Referring to FIG. 5, when the connector 100 and the mating connector 800 are mated with each other, the terminals 400, 500 are connected with the mating terminals 850, respectively.

As shown in FIG. 8, the terminals 400 form the terminal row 300. The terminals 400 are arranged in the pitch direction. The terminals 400 are held by the side wall portion 210. The terminals 400 correspond to the terminals 500, respectively. The terminals 400 correspond to the receiving portions 212 and the press-fit parts 214, respectively.

Figure 16:
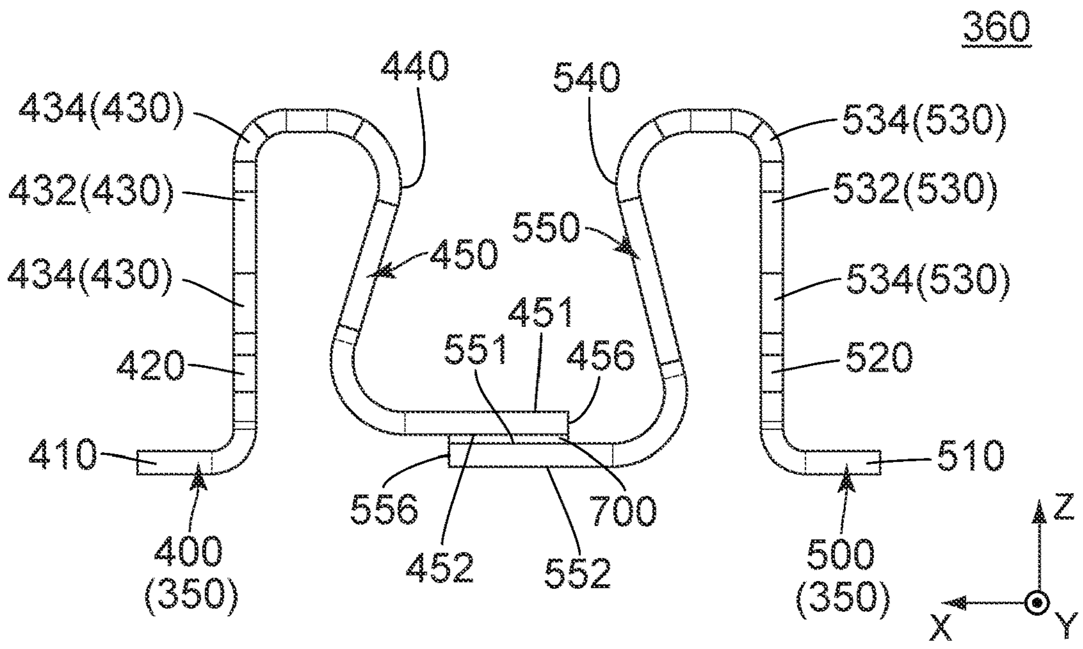
FIG. 16 is a side view showing the contact structure of FIG. 12.

As shown in FIG. 16, each of the terminals 400 is manufactured by punching out a blank from a metal plate, followed by bending the blank. In other words, each of the terminals 400 has a uniform thickness. Each of the terminals 400 has a fixed portion 410, a press-fit portion 420, a supporting portion 430, a contact point 440 and a coupled portion 450.

As shown in FIG. 16, the fixed portion 410 of the present embodiment defines an outer end of the terminal 400 in the width direction. Specifically, the fixed portion 410 defines a front end of the terminal 400 in the front-rear direction. The fixed portion 410 defines a lower end of the terminal 400 in the up-down direction. The fixed portion 410 is fixed to a pad (not shown) of the circuit board when the connector 100 is mounted on the circuit board.

As shown in FIG. 16, the press-fit portion 420 of the present embodiment extends upward in the up-down direction from an inner end of the fixed portion 410 in the width direction. Specifically, the press-fit portion 420 extends upward in the up-down direction from a rear end of the fixed portion 410 in the front-rear direction. As shown in FIG. 11, the press-fit portion 420 is press-fit into the side wall portion 210. More specifically, the press-fit portion 420 of the terminal 400 is press-fit into the corresponding press-fit part 214 of the side wall portion 210.

As shown in FIG. 16, the supporting portion 430 of the present embodiment extends from the press-fit portion 420. More specifically, the supporting portion 430 extends upward in the up-down direction from an upper end of the press-fit portion 420, and is bent so that it extends inward in the width direction, and is further bent so that it extends downward in the up-down direction. Specifically, the supporting portion 430 extends upward in the up-down direction from the upper end of the press-fit portion 420, and is bent so that it extends rearward in the front-rear direction, and is further bent so that it extends downward in the up-down direction. The supporting portion 430 is resiliently deformable. As understood from FIGS. 5 and 11, the receiving portion 212 partially receives the supporting portion 430 when the supporting portion 430 is resiliently deformed. Specifically, each of the receiving portions 212 partially receives the supporting portion 430 of the corresponding terminal 400 when the supporting portion 430 of the corresponding terminal 400 is resiliently deformed. The supporting portion 430 of the terminal 400 is positioned between the corresponding receiving portion 212 and the contact point 440 in the width direction. The supporting portion 430 of the terminal 400 is positioned inward of the corresponding receiving portion 212 in the width direction. Specifically, the supporting portion 430 of the terminal 400 is positioned rearward of the corresponding receiving portion 212 in the front-rear direction.

Figure 13:
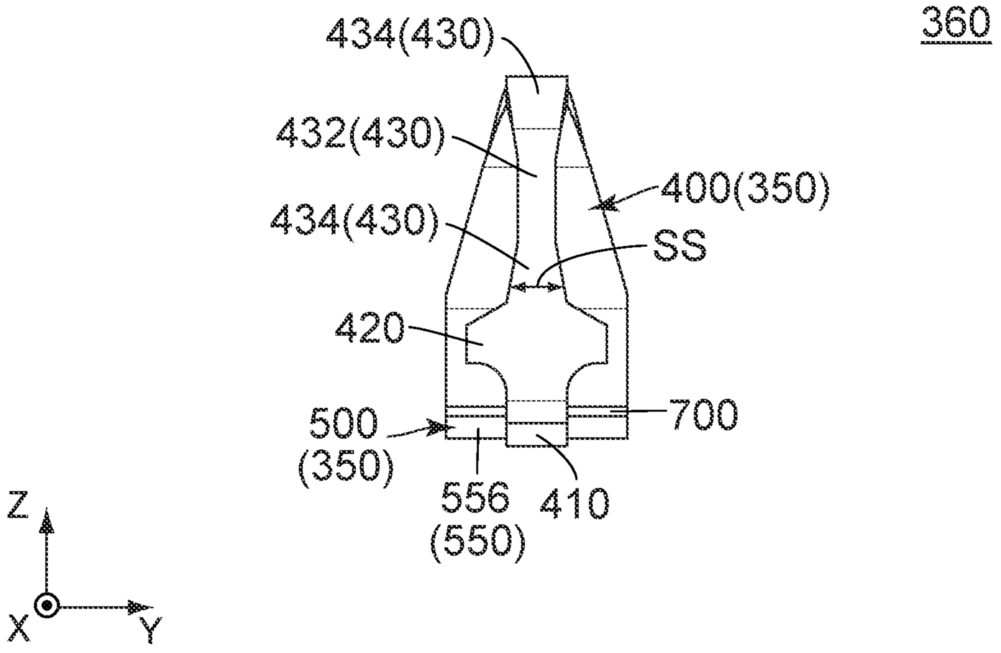
FIG. 13 is a front view showing the contact structure of FIG. 12.

As shown in FIG. 13, the supporting portion 430 has a narrow portion 432 and two wide portions 434. Specifically, in the pitch direction, the narrow portion 432 has a size smaller than an average size of the supporting portion 430. Additionally, in the pitch direction, each of the wide portions 434 has a size greater than the average size of the supporting portion 430.

As shown in FIG. 13, the narrow portion 432 of the present embodiment is positioned between the two wide portions 434 in the up-down direction. The size of the narrow portion 432 in the pitch direction is smaller than the size of any of the wide portions 434 in the pitch direction. As shown in FIG. 16, the narrow portion 432 is nearer to the contact point 440 than any of the wide portions 434 is in the up-down direction.

As shown in FIG. 13, in the present embodiment, one of the wide portions 434 is coupled with the press-fit portion 420. Specifically, a lower end of the one of the wide portions 434 is coupled with an upper end of the press-fit portion 420. The one of the wide portions 434 couples the narrow portion 432 and the press-fit portion 420 with each other. A remaining one of the wide portions 434 is coupled with the narrow portion 432. Specifically, a lower end of the remaining one of the wide portions 434 is coupled with an upper end of the narrow portion 432. The size of each of the wide portions 434 in the pitch direction is greater than the size of the narrow portion 432 in the pitch direction. As shown in FIG. 16, each of the wide portions 434 is farther away from the contact point 440 than the narrow portion 432 is in the up-down direction.

Referring to FIG. 5, the contact point 440 of the present embodiment is brought into contact with the mating contact portion 852 when the connector 100 and the mating connector 800 are mated with each other. As shown in FIG. 16, the contact point 440 is supported by the supporting portion 430. Specifically, the contact point 440 is resiliently supported by the supporting portion 430. Since the supporting portion 430 is resiliently deformable as described above, the contact point 440 is movable in the width direction. The contact point 440 faces inward in the width direction. Specifically, the contact point 440 faces rearward in the front-rear direction.

As shown in FIG. 16, the coupled portion 450 of the present embodiment extends from the contact point 440. The coupled portion 450 extends downward in the up-down direction and outward in the width direction from the contact point 440, and is bent so that it extends inward in the width direction. Specifically, the coupled portion 450 extends downward in the up-down direction and forward in the front-rear direction from the contact point 440, and is bent so that it extends rearward in the front-rear direction. The coupled portion 450 defines an inner end of the terminal 400 in the width direction. Specifically, the coupled portion 450 defines a rear end of the terminal 400 in the front-rear direction. Referring to FIGS. 13 and 15, in each of the terminals 400, a size SS of the supporting portion 430 in the pitch direction is smaller than a size CS of the coupled portion 450 in the pitch direction. As shown in FIG. 8, a part of the coupled portion 450 is visible when the connector 100 is viewed from above.

As shown in FIG. 16, the coupled portion 450 has an upper surface 451 and a lower surface 452 in the up-down direction perpendicular to both the width direction and the pitch direction. Additionally, the coupled portion 450 has an end surface 456 in the width direction.

As shown in FIG. 16, the upper surface 451 of the present embodiment faces upward in the up-down direction. The upper surface 451 is a surface intersecting with the up-down direction. As shown in FIG. 8, the upper surface 451 is visible when the connector 100 is viewed from above.

As shown in FIG. 16, the lower surface 452 of the present embodiment faces downward in the up-down direction. The lower surface 452 is a surface intersecting with the up-down direction.

As shown in FIG. 16, the end surface 456 of the present embodiment faces inward in the width direction. Specifically, the end surface 456 faces rearward in the front-rear direction. The end surface 456 is a surface intersecting with the width direction. The end surface 456 defines the inner end of the terminal 400 in the width direction. Specifically, the end surface 456 defines the rear end of the terminal 400 in the front-rear direction.

As shown in FIG. 8, the terminals 500 form the terminal row 310. The terminals 500 are arranged in the pitch direction. The terminals 500 are held by the side wall portion 211. The terminals 500 correspond to the receiving portions 213 and the press-fit parts 215, respectively.

As shown in FIG. 16, each of the terminals 500 is manufactured by punching out a blank from a metal plate, followed by bending the blank. In other words, each of the terminals 500 has a uniform thickness. The terminal 500 has a shape different from a shape of the terminal 400. Each of the terminals 500 has a fixed portion 510, a press-fit portion 520, a supporting portion 530, a contact point 540 and a coupled portion 550.

As shown in FIG. 16, the fixed portion 510 of the present embodiment defines an outer end of the terminal 500 in the width direction. Specifically, the fixed portion 510 defines a rear end of the terminal 500 in the front-rear direction. The fixed portion 510 defines a lower end of the terminal 500 in the up-down direction. The fixed portion 510 is fixed to a pad (not shown) of the circuit board when the connector 100 is mounted on the circuit board.

As shown in FIG. 16, the press-fit portion 520 of the present embodiment extends upward in the up-down direction from an inner end of the fixed portion 510 in the width direction. Specifically, the press-fit portion 520 extends upward in the up-down direction from a front end of the fixed portion 510 in the front-rear direction. As shown in FIG. 11, the press-fit portion 520 is press-fit into the side wall portion 211. More specifically, the press-fit portion 520 of the terminal 500 is press-fit into the corresponding press-fit part 215 of the side wall portion 211.

As shown in FIG. 16, the supporting portion 530 of the present embodiment extends from the press-fit portion 520. More in detail, the supporting portion 530 extends upward in the up-down direction from an upper end of the press-fit portion 520, and is bent so that it extends inward in the width direction, and is further bent so that it extends downward in the up-down direction. Specifically, the supporting portion 530 extends upward in the up-down direction from the upper end of the press-fit portion 520, and is bent so that it extends forward in the front-rear direction, and is further bent so that it extends downward in the up-down direction. The supporting portion 530 is resiliently deformable. As understood from FIGS. 5 and 11, the receiving portion 213 partially receives the supporting portion 530 when the supporting portion 530 is resiliently deformed. Specifically, each of the receiving portions 213 partially receives the supporting portion 530 of the corresponding terminal 500 when the supporting portion 530 of the corresponding terminal 500 is resiliently deformed. The supporting portion 530 of the terminal 500 is positioned between the corresponding receiving portion 213 and the contact point 540 in the width direction. The supporting portion 530 of the terminal 500 is positioned inward of the corresponding receiving portion 213 in the width direction. Specifically, the supporting portion 530 of the terminal 500 is positioned forward of the corresponding receiving portion 213 in the front-rear direction.

Figure 14:
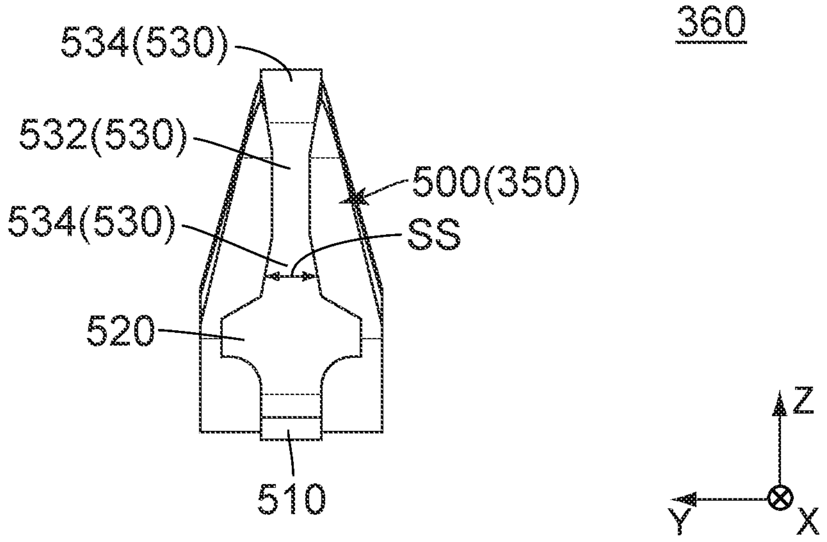
FIG. 14 is a rear view showing the contact structure of FIG. 12.

As shown in FIG. 14, the supporting portion 530 has a narrow portion 532 and two wide portions 534. Specifically, in the pitch direction, the narrow portion 532 has a size smaller than an average size of the supporting portion 530. Additionally, in the pitch direction, each of the wide portions 534 has a size greater than the average size of the supporting portion 530.

As shown in FIG. 14, the narrow portion 532 of the present embodiment is positioned between the two wide portions 534 in the up-down direction. The size of the narrow portion 532 in the pitch direction is smaller than the size of any of the wide portions 534 in the pitch direction. As shown in FIG. 16, the narrow portion 532 is nearer to the contact point 540 than any of the wide portions 534 is in the up-down direction.

As shown in FIG. 14, in the present embodiment, one of the wide portions 534 is coupled with the press-fit portion 520. Specifically, a lower end of the one of the wide portions 534 is coupled with an upper end of the press-fit portion 520. The one of the wide portions 534 couples the narrow portion 532 and the press-fit portion 520 with each other. A remaining one of the wide portions 534 is coupled with the narrow portion 532. Specifically, a lower end of the remaining one of the wide portions 534 is coupled with an upper end of the narrow portion 532. The size of each of the wide portions 534 in the pitch direction is greater than the size of the narrow portion 532 in the pitch direction. As shown in FIG. 16, each of the wide portions 534 is farther away from the contact point 540 than the narrow portion 532 is in the up-down direction.

Referring to FIG. 5, the contact point 540 of the present embodiment is brought into contact with the mating contact portion 852 when the connector 100 and the mating connector 800 are mated with each other. As shown in FIG. 16, the contact point 540 is supported by the supporting portion 530. Specifically, the contact point 540 is resiliently supported by the supporting portion 530. Since the supporting portion 530 is resiliently deformable as described above, the contact point 540 is movable in the width direction. The contact point 540 faces inward in the width direction. Specifically, the contact point 540 faces forward in the front-rear direction.

Referring to FIGS. 8 and 15, the contact point 440 of each of the terminals 400 of the one of the terminal rows 300, 310, or of the terminal row 300, faces the contact point 540 of the corresponding terminal 500 of the remaining one of the terminal rows 300, 310, or of the terminal row 310 in the width direction. That is, in each of the terminal pairs 350, the contact point 440 of the terminal 400 and the contact point 540 of the terminal 500 face each other in the width direction. In each of the terminal pairs 350, the contact point 440 of the terminal 400 and the contact point 540 of the terminal 500 are positioned at the same position as each other in the pitch direction. That is, in the pitch direction, the contact point 440 of each of the terminals 400 of the one of the terminal rows 300, 310, or of the terminal row 300, is positioned at the position same as the position of the contact point 540 of the corresponding terminal 500 of the remaining one of the terminal rows 300, 310, or of the terminal row 310. Thus, the connector 100 of the present embodiment is configured so that contact force of the contact point 440 of the terminal 400 of the terminal row 300 against the mating terminal 850 and contact force of the contact point 540 of the corresponding terminal 500 of the terminal row 310 against the mating terminal 850 do not act as a couple of forces when the connector 100 and the mating connector 800 are mated with each other and the terminals 400, 500 are connected with the mating terminals 850.

Figure 7:
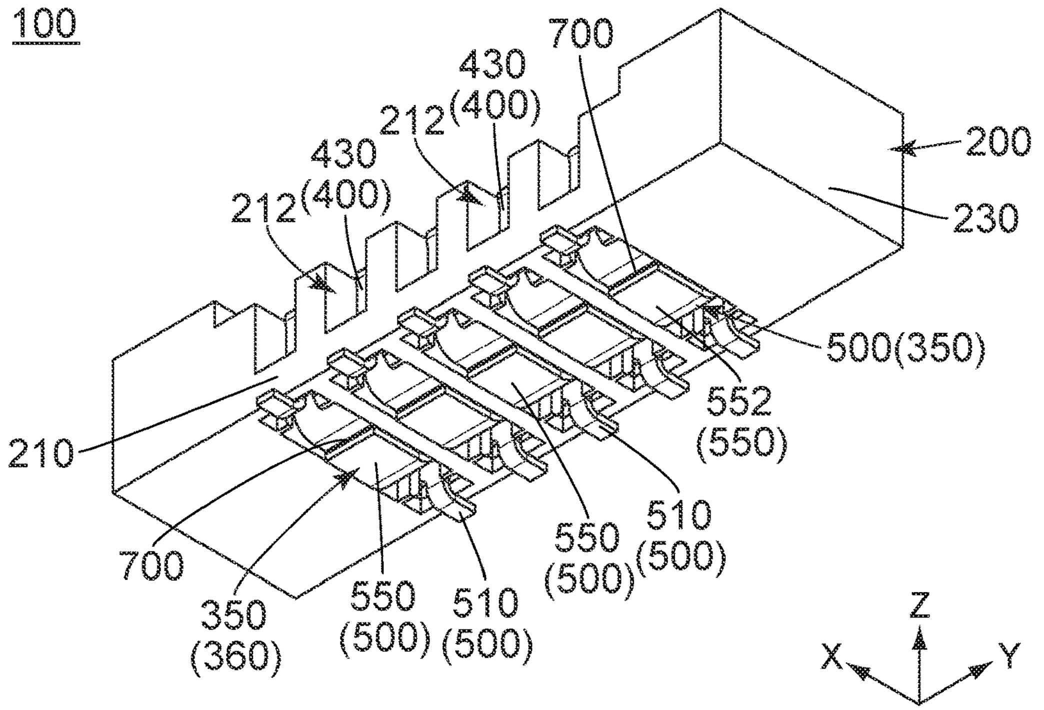
FIG. 7 is a lower, perspective view showing the connector of FIG. 6.
Figure 17:
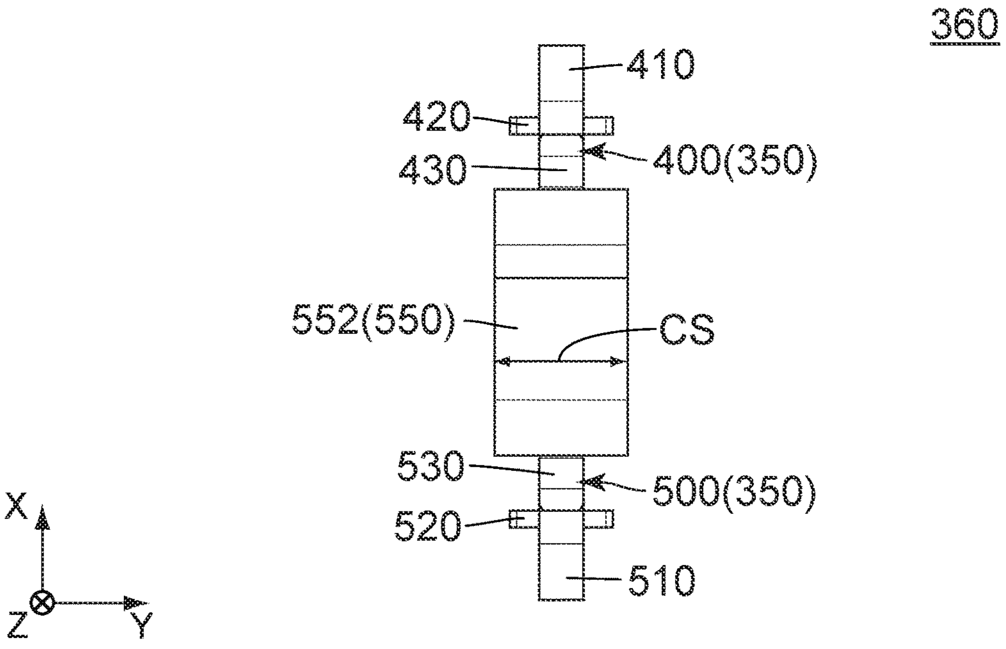
FIG. 17 is a bottom view showing the contact structure of FIG. 12.

As shown in FIG. 16, the coupled portion 550 of the present embodiment extends from the contact point 540. The coupled portion 550 extends downward in the up-down direction and outward in the width direction from the contact point 540, and is bent so that it extends inward in the width direction. Specifically, the coupled portion 550 extends downward in the up-down direction and rearward in the front-rear direction from the contact point 540, and is bent so that it extends forward in the front-rear direction. The coupled portion 550 defines an inner end of the terminal 500 in the width direction. Specifically, the coupled portion 550 defines a front end of the terminal 500 in the front-rear direction. Referring to FIGS. 14 and 17, in each of the terminals 500, a size SS of the supporting portion 530 in the pitch direction is smaller than a size CS of the coupled portion 550 in the pitch direction. As shown in FIG. 7, a part of the coupled portion 550 is visible when the connector 100 is viewed from below.

Referring to FIGS. 8 and 16, the coupled portion 450 of each of the terminals 400 of the one of the terminal rows 300, 310, or of the terminal row 300, is positioned at a position different from a position of the coupled portion 550 of the corresponding terminal 500 of the remaining one of the terminal rows 300, 310, or of the terminal row 310, in the up-down direction. Specifically, the coupled portion 450 of each of the terminals 400 of the terminal row 300 is positioned above the coupled portion 550 of the corresponding terminal 500 of the terminal row 310 in the up-down direction. A position of the coupled portion 450 of each of the terminals 400 of the one of the terminal rows 300, 310, or of the terminal row 300, overlaps with a position of the coupled portion 550 of the corresponding terminal 500 of the remaining one of the terminal rows 300, 310, or of the terminal row 310, in the width direction. Referring to FIGS. 15 and 17, the coupled portion 450 of each of the terminals 400 of the one of the terminal rows 300, 310, or of the terminal row 300, is positioned at a position same as a position of the coupled portion 550 of the corresponding terminal 500 of the remaining one of the terminal rows 300, 310, or of the terminal row 310, in the pitch direction.

As shown in FIG. 16, the coupled portion 550 has an upper surface 551 and a lower surface 552 in the up-down direction perpendicular to both the width direction and the pitch direction. Additionally, the coupled portion 550 has an end surface 556 in the width direction.

As shown in FIG. 16, the upper surface 551 of the present embodiment faces upward in the up-down direction. The upper surface 551 is a surface intersecting with the up-down direction.

As shown in FIG. 16, the lower surface 552 of the present embodiment faces downward in the up-down direction. The lower surface 552 is a surface intersecting with the up-down direction. As shown in FIG. 7, the lower surface 552 is visible when the connector 100 is viewed from below.

As shown in FIG. 16, the end surface 556 of the present embodiment faces inward in the width direction. Specifically, the end surface 556 faces forward in the front-rear direction. The end surface 556 is a surface intersecting with the width direction. The end surface 556 defines the inner end of the terminal 500 in the width direction. Specifically, the end surface 556 defines the front end of the terminal 500 in the front-rear direction.

Figure 9:
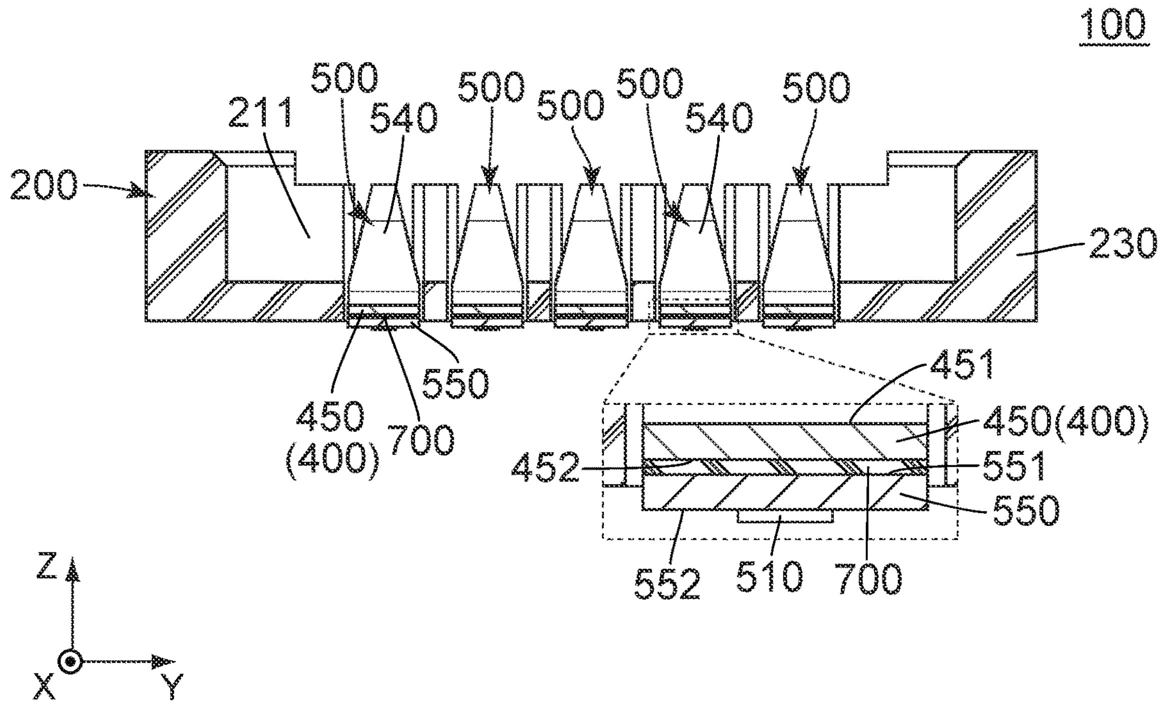
FIG. 9 is a cross-sectional view showing the connector of FIG. 8, taken along line C-C.
Figure 10:
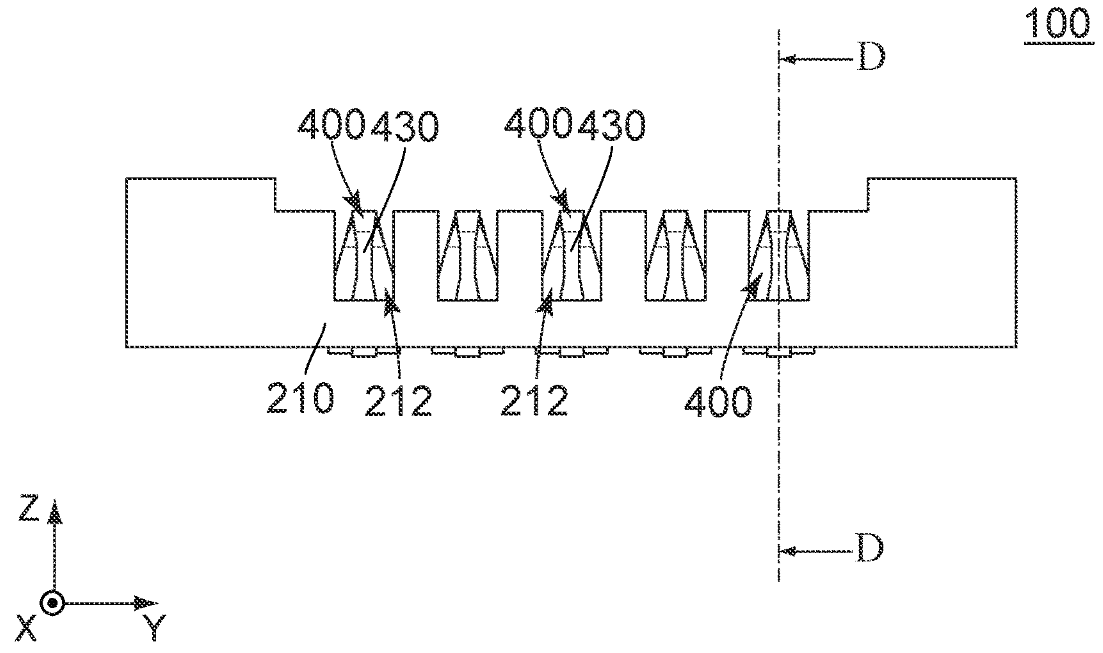
FIG. 10 is a front view showing the connector of FIG. 6.

Referring to FIG. 9, each of the coupling portions 700 of the present embodiment is made of insulator. Specifically, each of the coupling portions 700 is formed of a sheet-like insulative base member whose upper and lower surfaces are coated with adhesive. Referring to FIG. 16, the coupling portions 700 correspond to the terminal pairs 350, respectively. The terminal pair 350 and the corresponding coupling portion 700 form a contact structure 360. In the contact structure 360, the coupled portion 450 of the terminal 400 and the coupled portion 550 of the terminal 500 are positioned at the positions different from each other in the up-down direction. The contact structure 360 has an asymmetric shape with respect to a plane which is perpendicular to the width direction while passing through a middle of the contact structure 360 in the width direction. Referring to FIGS. 15 and 17, in the contact structure 360, the coupled portion 450 of the terminal 400 and the coupled portion 550 of the terminal 500 are positioned at the same position as each other in the pitch direction.

As described above, the connector 100 of the present embodiment is configured so that the contact force of the contact point 440 of the terminal 400 of the terminal row 300 against the mating terminal 850 and the contact force of the contact point 540 of the corresponding terminal 500 of the terminal row 310 against the mating terminal 850 do not act as the couple of forces when the connector 100 and the mating connector 800 are mated with each other and the terminals 400, 500 are connected with the mating terminals 850. Thus, a moment about a rotational axis parallel to the up-down direction is not produced in the contact structure 360 when the connector 100 and the mating connector 800 are mated with each other and the terminals 400, 500 are connected with the mating terminals 850.

Referring to FIGS. 8 and 11, each of the coupling portions 700 couples the coupled portion 450 of the terminal 400 of the one of the terminal rows 300, 310, or of the terminal row 300, with the coupled portion 550 of the corresponding terminal 500 of the remaining one of the terminal rows 300, 310, or of the terminal row 310, in a direction perpendicular to the pitch direction. In other words, the connector 100 of the present embodiment is configured so that the coupled portion 450 of each of the terminals 400 of the terminal row 300 and the coupled portion 550 of the corresponding terminal 500 of the terminal row 310 are coupled with each other in the direction perpendicular to the pitch direction by the coupling portion 700 made of insulator. This enables the connector 100 of the present embodiment to be configured as follows: in a case where the mating connector 800 is moved relative to the connector 100 in a first orientation of the width direction under a mated state where the connector 100 and the mating connector 800 are mated with each other, ones of mating terminals 850 are pressed against ones of the terminals 400, 500 corresponding thereto and belonging to the terminal row 300, 310 which is positioned at a first side of the connector 100 in the first orientation; and, in this case, the others of the terminals 400, 500 of the terminal row 300, 310, which is positioned at a second side of the connector 100 in a second orientation opposite to the first orientation of the width direction, are moved in the first orientation and thereby the contact between the others of the terminals 400, 500 of the terminal row 300, 310 at the second side of the connector 100 and the others of the mating terminals 850 corresponding thereto is also maintained. In other words, the connector 100 of the present invention can ensure reliable contact between the terminals 400, 500 and the mating terminals 850 when the mating connector 800 is moved in the width direction relative to the connector 100 under the mated state where the connector 100 and the mating connector 800 are mated with each other.

As described above, in each of the terminals 400, the size SS of the supporting portion 430 in the pitch direction is smaller than the size CS of the coupled portion 450 in the pitch direction. Additionally, as described above, in each of the terminals 500, the size SS of the supporting portion 530 in the pitch direction is smaller than the size CS of the coupled portion 550 in the pitch direction. Thus, when the mating connector 800 is moved in the width direction relative to the connector 100 under the mated state where the connector 100 and the mating connector 800 are mated with each other, the supporting portions 430, 530 are easily deformable resiliently and thereby the contact points 440, 540 easily follow the movement of the mating connector 800 in the width direction. When the mating connector 800 is moved in the width direction relative to the connector 100 under the mated state where the connector 100 and the mating connector 800 are mated with each other, spring force, which is produced by the coupled portions 450, 550 and the coupling portion 700, presses the terminals 400, 500 against the mating contact portions 852 from the outsides of the mating contact portions 852 in the width direction to produce the contact forces of terminals 400, 500 against the mating terminals 850, respectively. That is, the connector 100 of the present embodiment is configured so that a difference between the contact force of the terminal 400 against the mating terminal 850 and the contact force of the corresponding terminal 500 against the mating terminal 850 is not produced even when the mating connector 800 is moved in the width direction relative to the connector 100 under the mated state where the connector 100 and the mating connector 800 are mated with each other.

As described above, the contact structure 360 of the present embodiment is configured as follows: each of the terminals 400, 500 has the uniform thickness; the supporting portion 430 has the narrow portion 432 and the two wide portions 434; in the pitch direction, the narrow portion 432 has the size smaller than the average size of the supporting portion 430; in the pitch direction, each of the wide portions 434 has the size greater than the average size of the supporting portion 430; the narrow portion 432 is nearer to the contact point 440 than any of the wide portions 434 is in the up-down direction; the supporting portion 530 has the narrow portion 532 and the two wide portions 534; in the pitch direction, the narrow portion 532 has the size smaller than the average size of the supporting portion 530; in the pitch direction, each of the wide portions 534 has the size greater than the average size of the supporting portion 530; and the narrow portion 532 is nearer to the contact point 540 than any of the wide portions 534 is in the up-down direction. Specifically, referring to FIGS. 5 and 11, the narrow portion 432, which has the size smaller than the average size of the supporting portion 430 in the pitch direction, is positioned at a location where bending moment upon the mating of the connector 100 with the mating connector 800 is small because the location is near to the contact point 440. Similarly, referring to FIGS. 5 and 11, the narrow portion 532, which has the size smaller than the average size of the supporting portion 530 in the pitch direction, is positioned at a location where bending moment upon the mating of the connector 100 with the mating connector 800 is small because the location is near to the contact point 540. In contrast, referring to FIGS. 5 and 11, each of the wide portions 434, which has the size greater than the average size of the supporting portion 430 in the pitch direction, is positioned at a location where bending moment upon the mating of the connector 100 with the mating connector 800 is large because the location is farther away from the contact point 440. Similarly, referring to FIGS. 5 and 11, each of the wide portions 534, which has the size greater than the average size of the supporting portion 530 in the pitch direction, is positioned at a location where bending moment upon the mating of the connector 100 with the mating connector 800 is large because the location is farther away from the contact point 540. This enables bending stresses, which are produced at various locations of the supporting portions 430, 530 upon the mating of the connector 100 with the mating connector 800, to be uniform. Thus, the contact structure 360 of the present embodiment prevents plastic deformations of the supporting portions 430, 530 which might be caused by stress concentrations at parts of the supporting portions 430, 530 upon the mating of the connector 100 with the mating connector 800. It is noted that the arrangements and sizes in the pitch direction of the narrow portions 432, 532 and the wide portions 434, 534 can be appropriately configured with consideration given to the shape of the contact structure 360.

Referring to FIGS. 8 and 16, each of the coupling portions 700 is sandwiched between the coupled portion 450 of the terminal 400 of the one of the terminal rows 300, 310, or of the terminal row 300, and the coupled portion 550 of the corresponding terminal 500 of the remaining one of the terminal rows 300, 310, or of the terminal row 310, in the up-down direction perpendicular to both the width direction and the pitch direction. Each of the coupling portions 700 couples the coupled portion 450 of the terminal 400 of the one of the terminal rows 300, 310, or of the terminal row 300, with the coupled portion 550 of the corresponding terminal 500 of the remaining one of the terminal rows 300, 310, or of the terminal row 310, in the up-down direction. Specifically, each of the coupling portions 700 couples the lower surface 452 of the coupled portion 450 of the terminal 400 of the terminal row 300 with the upper surface 551 of the coupled portion 550 of the corresponding terminal 500 of the terminal row 310 in the up-down direction. It is noted that the coupling portion 700 is not coupled with any of the end surface 456 of the terminal 400 and the end surface 556 of the terminal 500.

Referring to FIGS. 9 and 16, in each of the contact structures 360, the corresponding coupling portion 700 is sandwiched between the coupled portion 450 of the terminal 400 and the coupled portion 550 of the terminal 500 in the up-down direction perpendicular to both the width direction and the pitch direction. In each of the contact structures 360, the coupling portion 700 couples the coupled portion 450 of the terminal 400 with the coupled portion 550 of the terminal 500 in the direction perpendicular to the pitch direction. Specifically, in each of the contact structures 360, the coupling portion 700 couples the coupled portion 450 of the terminal 400 with the coupled portion 550 of the terminal 500 in the up-down direction perpendicular to the pitch direction. More in detail, in each of the contact structures 360, the coupling portion 700 couples the lower surface 452 of the coupled portion 450 of the terminal 400 with the upper surface 551 of the coupled portion 550 of the terminal 500 in the up-down direction.

Referring to FIG. 16, the coupling of the coupling portion 700 with the coupled portion 450 of the terminal 400 and the coupling of the coupling portion 700 with the coupled portion 550 of the terminal 500 are achieved, for example, as follows. Each of the coupling portions 700 is sandwiched by the coupled portion 450 of the terminal 400 and the coupled portion 550 of the terminal 500, and heat and pressure are applied to the coupled portions 450, 550 in this state so that the coupling portion 700 is coupled with both of the coupled portion 450 and the coupled portion 550.

Where the present embodiment of the present invention is described above, the present embodiment may be modified as follows.

(First Modification)

Figure 18:
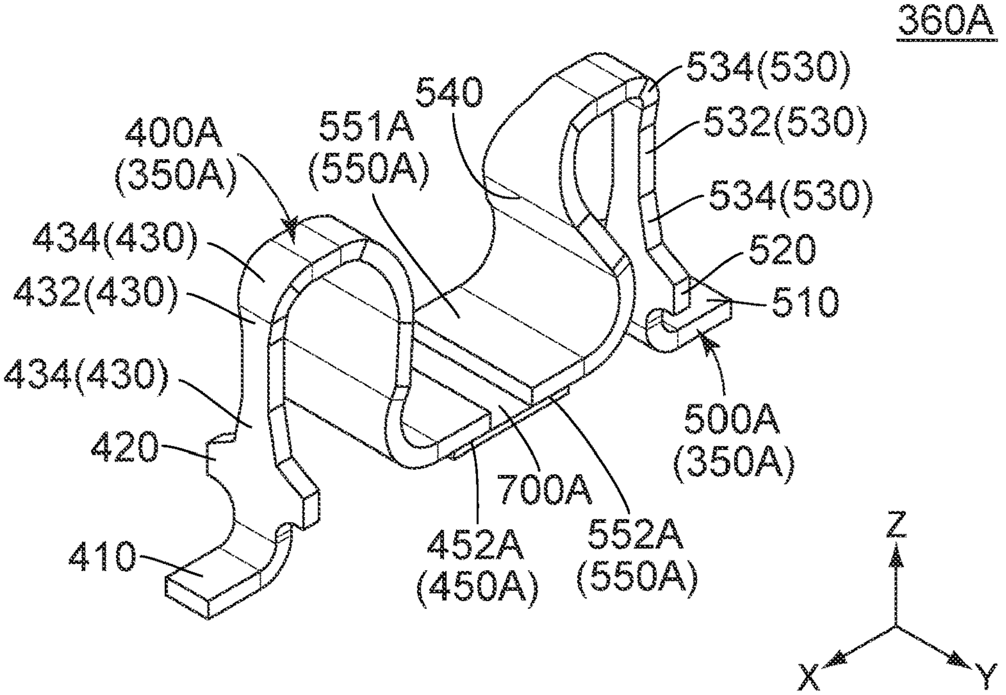
FIG. 18 is a perspective view showing a contact structure which is included in a first modification of the connector of FIG. 6.

Referring to FIGS. 6 and 18, a connector of a first modification (not shown) comprises a housing (not shown), a plurality of terminals 400A, 500A and a plurality of coupling portions 700A. The housing of the present modification has a structure same as that of the housing 200 of the aforementioned embodiment. Accordingly, detailed explanation thereabout is omitted.

Figure 21:
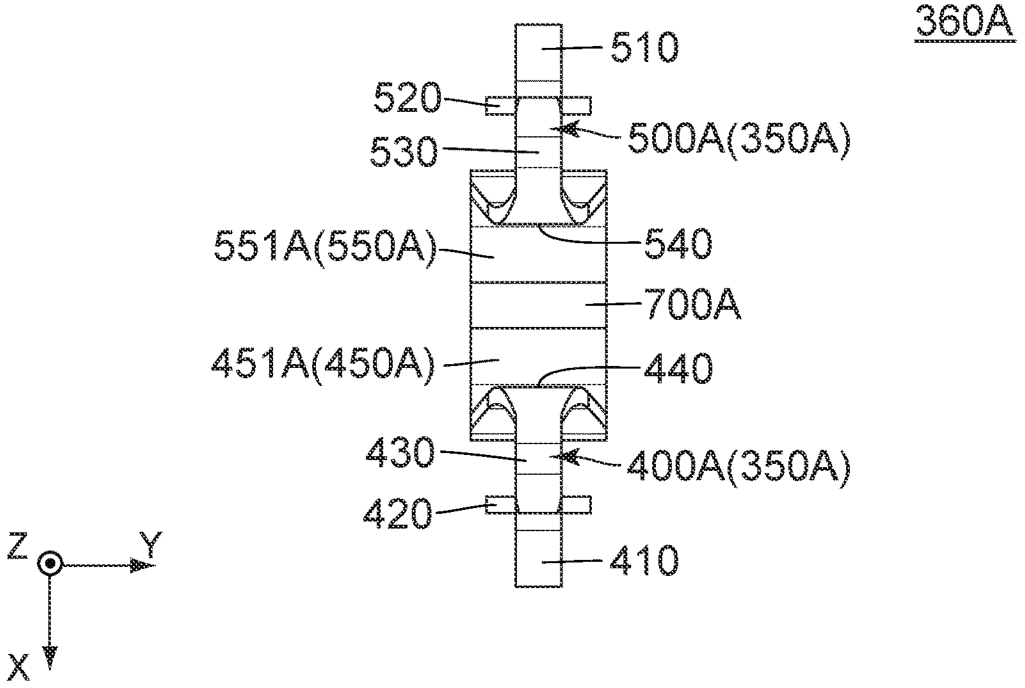
FIG. 21 is a top view showing the contact structure of FIG. 18.
Figure 22:
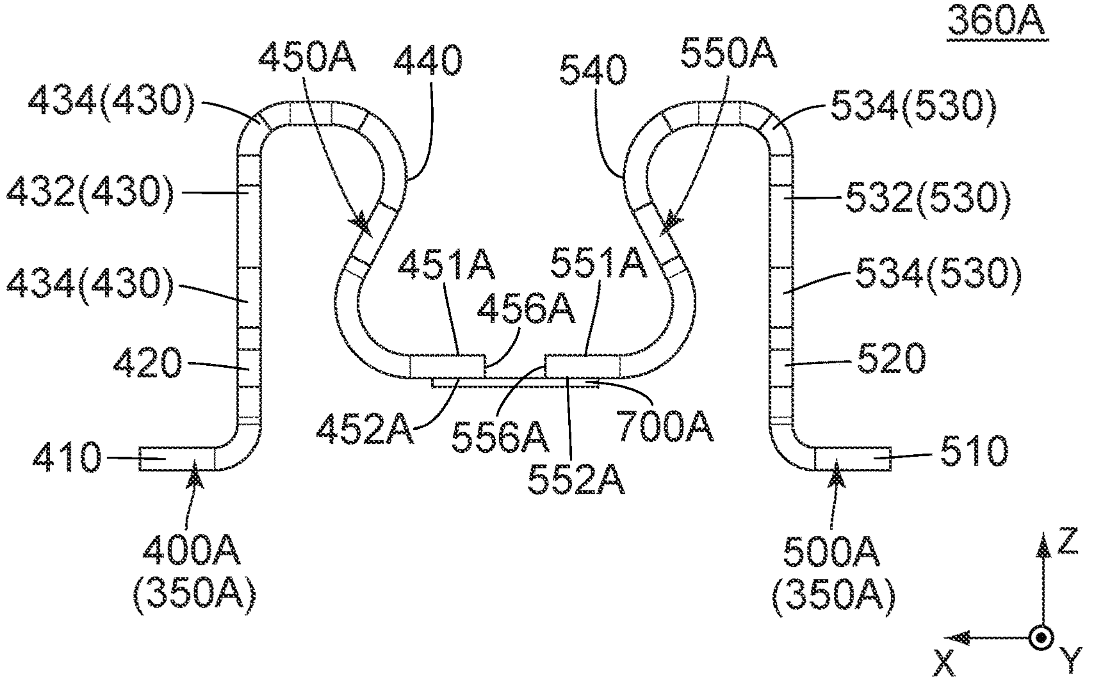
FIG. 22 is a side view showing the contact structure of FIG. 18.
Figure 23:
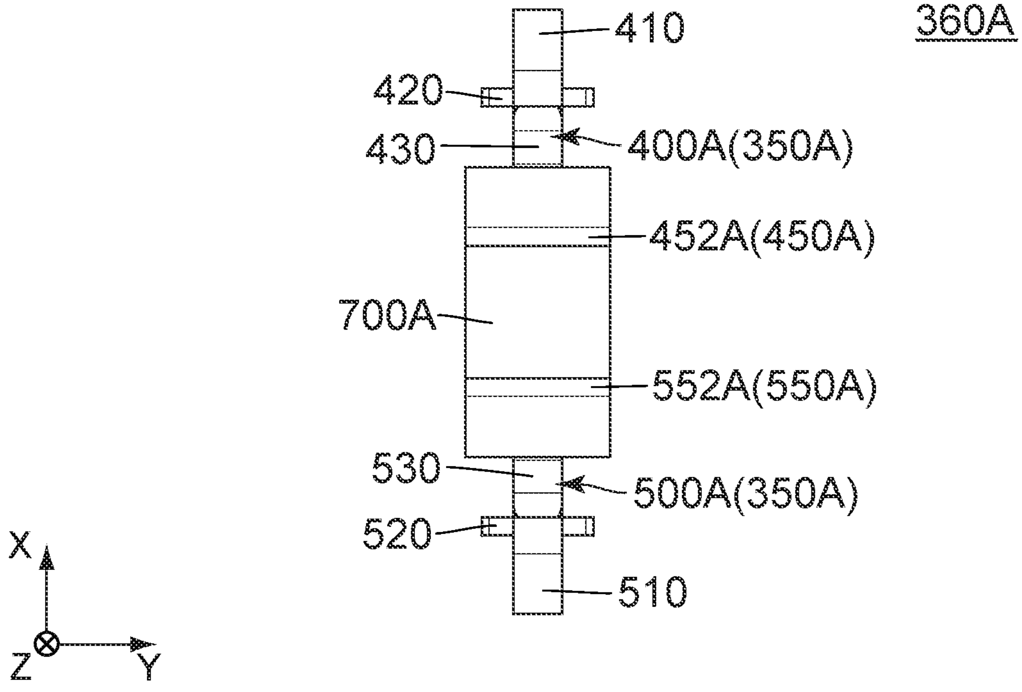
FIG. 23 is a bottom view showing the contact structure of FIG. 18.

Referring to FIG. 22, the terminals 400A, 500A of the present modification form two terminal rows (not shown). Specifically, the terminals 400A of the present modification form a terminal row (not shown) while the terminals 500A of the present modification form another terminal row (not shown). The two terminal rows are arranged in the width direction, or in the front-rear direction. The two terminal rows are respectively held by two side wall portions (not shown) of the housing. In each of the two terminal rows, the terminals 400A are arranged in the pitch direction perpendicular to the width direction while the terminals 500A are arranged in the pitch direction perpendicular to the width direction. The terminals 400A of one of the two terminal rows respectively correspond to the terminals 500A of a remaining one of the two terminal rows. The terminal 400A of the one of the terminal rows and the corresponding terminal 500A of the remaining one of the terminal rows form a terminal pair 350A. Referring to FIG. 21, in the pitch direction, the terminal 400A of the one of the terminal rows is positioned at a position same as a position of the corresponding terminal 500A of the remaining one of the terminal rows. That is, in each of the terminal pairs 350A, the two terminals 400A and 500A are positioned at the same position as each other in the pitch direction. The terminals 400A, 500A are respectively connected with mating terminals (not shown) of a mating connector (not shown) when the connector and the mating connector are mated with each other.

As shown in FIG. 22, each of the terminals 400A is manufactured by punching out a blank from a metal plate, followed by bending the blank. In other words, each of the terminals 400A has a uniform thickness. Each of the terminals 400A has a fixed portion 410, a press-fit portion 420, a supporting portion 430, a contact point 440 and a coupled portion 450A. The fixed portion 410, the press-fit portion 420, the supporting portion 430 and the contact point 440 of the present modification have structures same as those of the fixed portion 410, the press-fit portion 420, the supporting portion 430 and the contact point 440 of the aforementioned embodiment. Accordingly, detailed explanation thereabout is omitted.

Figure 19:
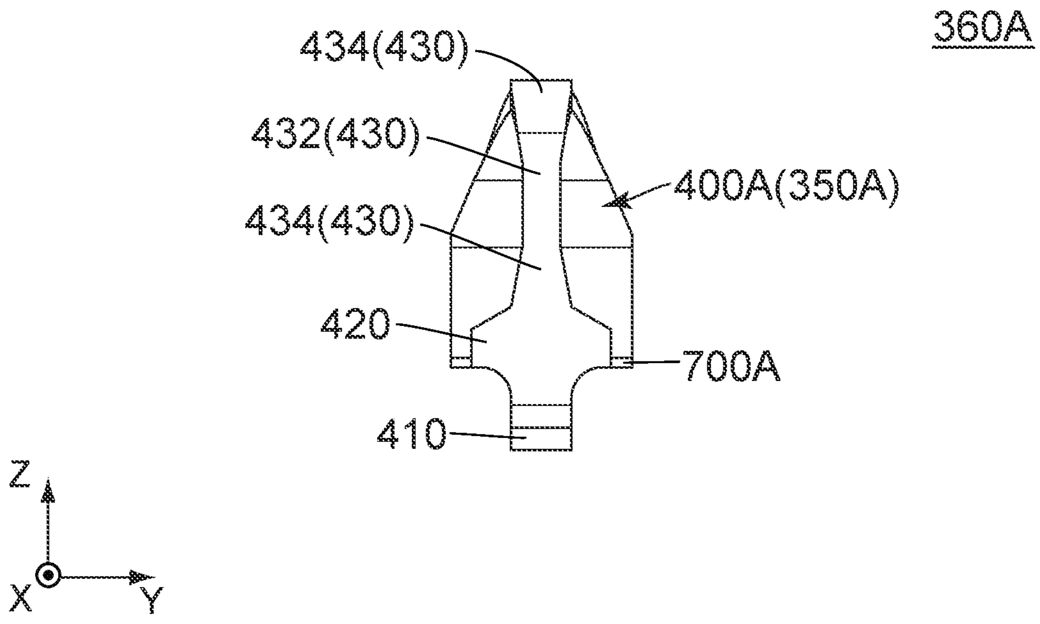
FIG. 19 is a front view showing the contact structure of FIG. 18.

As shown in FIG. 22, the coupled portion 450A of the present modification extends from the contact point 440. The coupled portion 450A extends downward in the up-down direction and outward in the width direction from the contact point 440, and is bent so that it extends inward in the width direction. Specifically, the coupled portion 450A extends downward in the up-down direction and forward in the front-rear direction from the contact point 440, and is bent so that it extends rearward in the front-rear direction. The coupled portion 450A defines an inner end of the terminal 400A in the width direction. Specifically, the coupled portion 450A defines a rear end of the terminal 400A in the front-rear direction. Referring to FIGS. 19 and 21, in each of the terminals 400A, a size of the supporting portion 430 in the pitch direction is smaller than a size of the coupled portion 450A in the pitch direction.

As shown in FIG. 22, the coupled portion 450A has an upper surface 451A and a lower surface 452A in the up-down direction perpendicular to both the width direction and the pitch direction. Additionally, the coupled portion 450A has an end surface 456A in the width direction. The upper surface 451A, the lower surface 452A and the end surface 456A of the present modification have structures same as those of the upper surface 451, the lower surface 452 and the end surface 456 of the aforementioned embodiment. Accordingly, detailed explanation thereabout is omitted.

As shown in FIG. 22, the terminal 500A has the same shape as the terminal 400A. Each of the terminals 500A is manufactured by punching out a blank from a metal plate, followed by bending the blank. Specifically, each of the terminals 500A has a uniform thickness. Each of the terminals 500A has a fixed portion 510, a press-fit portion 520, a supporting portion 530, a contact point 540 and a coupled portion 550A. The fixed portion 510, the press-fit portion 520, the supporting portion 530 and the contact point 540 of the present modification have structures same as those of the fixed portion 510, the press-fit portion 520, the supporting portion 530 and the contact point 540 of the aforementioned embodiment. Accordingly, detailed explanation thereabout is omitted.

Figure 20:
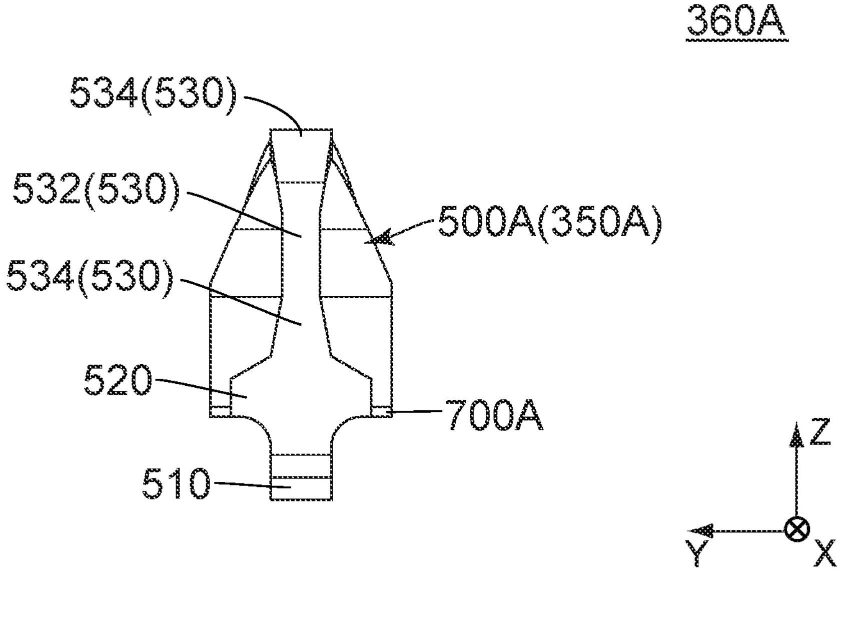
FIG. 20 is a rear view showing the contact structure of FIG. 18.

As shown in FIG. 22, the coupled portion 550A of the present modification extends from the contact point 540. The coupled portion 550A extends downward in the up-down direction and outward in the width direction from the contact point 540, and is bent so that it extends inward in the width direction. Specifically, the coupled portion 550A extends downward in the up-down direction and rearward in the front-rear direction from the contact point 540, and is bent so that it extends forward in the front-rear direction. The coupled portion 550A defines an inner end of the terminal 500A in the width direction. Specifically, the coupled portion 550A defines a front end of the terminal 500A in the front-rear direction. Referring to FIGS. 20 and 21, in each of the terminals 500A, a size of the supporting portion 530 in the pitch direction is smaller than a size of the coupled portion 550A in the pitch direction.

Referring to FIG. 22, the coupled portion 450A of each of the terminals 400A of the one of the terminal rows is positioned away from the coupled portion 550A of the corresponding terminal 500A of the remaining one of the terminal rows in the width direction. The coupled portion 450A of each of the terminals 400A of the one of the terminal rows is positioned at a position same as a position of the coupled portion 550A of the corresponding terminal 500A of the remaining one of the terminal rows in the up-down direction. Referring to FIG. 21, the coupled portion 450A of each of the terminals 400A of the one of the terminal rows is positioned at a position same as a position of the coupled portion 550A of the corresponding terminal 500A of the remaining one of the terminal rows in the pitch direction.

As shown in FIG. 22, the coupled portion 550A has an upper surface 551A and a lower surface 552A in the up-down direction perpendicular to both the width direction and the pitch direction. Additionally, the coupled portion 550A has an end surface 556A in the width direction. The upper surface 551A, the lower surface 552A and the end surface 556A of the present modification have structures same as those of the upper surface 551, the lower surface 552 and the end surface 556 of the aforementioned embodiment. Accordingly, detailed explanation thereabout is omitted.

Referring to FIG. 22, each of the coupling portions 700A of the present embodiment is made of insulator. The coupling portions 700A correspond to the terminal pairs 350A, respectively. The terminal pair 350A and the corresponding coupling portion 700A form a contact structure 360A. In the contact structure 360A of the present modification, the coupled portion 450A of the terminal 400A and the coupled portion 550A of the terminal 500A are positioned away from each other in the width direction. In the contact structure 360A, the coupled portion 450A of the terminal 400A and the coupled portion 550A of the terminal 500A are positioned at the same position as each other in the up-down direction. The contact structure 360A has a symmetrical shape with respect to a plane which is perpendicular to the width direction while passing through a middle of the contact structure 360A in the width direction. Referring to FIG. 21, in the contact structure 360A, the coupled portion 450A of the terminal 400A and the coupled portion 550A of the terminal 500A are positioned at the same position as each other in the pitch direction.

Referring to FIG. 22, each of the coupling portions 700A couples the coupled portion 450A of the terminal 400A of the one of the terminal rows with the coupled portion 550A of the corresponding terminal 500A of the remaining one of the terminal rows in a direction perpendicular to the pitch direction. In other words, the connector of the present modification is configured so that the coupled portion 450A of the terminal 400A of the one of the two terminal rows and the coupled portion 550A of the corresponding terminal 500A of the remaining one of the two terminal rows are coupled with each other by the coupling portion 700A, which is made of insulator, in the direction perpendicular to the pitch direction. This enables the connector of the present modification to be configured as follows: in a case where the mating connector is moved relative to the connector in the first orientation of the width direction under a mated state where the connector and the mating connector are mated with each other, ones of the mating terminals are pressed against ones of the terminals 400A, 500A corresponding thereto and belonging to the terminal row which is positioned at a first side of the connector in the first orientation; and, in this case, the others of the terminals 400A, 500A of the terminal row, which is positioned at a second side of the connector in the second orientation opposite to the first orientation of the width direction, are moved in the first orientation and thereby the contact between the others of the terminals 400A, 500A of the terminal row at the second side of the connector and the others of the mating terminals corresponding thereto is also maintained. In other words, the connector of the present modification can ensure reliable contact between the terminals 400A, 500A and the mating terminals when the mating connector is moved in the width direction relative to the connector under the mated state where the connector and the mating connector are mated with each other.

Referring to FIG. 22, each of the coupling portions 700A couples the coupled portion 450A of the terminal 400A of the one of the terminal rows with the coupled portion 550A of the corresponding terminal 500A of the remaining one of the terminal rows in the width direction perpendicular to the pitch direction.

Referring to FIG. 22, each of the coupling portions 700A couples the lower surface 452A of the coupled portion 450A of the terminal 400A of the one of the terminal rows with the lower surface 552A of the coupled portion 550A of the corresponding terminal 500A of the remaining one of the terminal rows in the width direction. However, the present invention is not limited thereto, but each of the coupling portions 700A may couple the upper surface 451A of the coupled portion 450A of the terminal 400A of the one of the terminal rows with the upper surface 551A of the coupled portion 550A of the corresponding terminal 500A of the remaining one of the terminal rows in the width direction. In other words, the connector of the present modification should be configured so that each of the coupling portions 700A couples the upper surface 451A of the coupled portion 450A of the terminal 400A of the one of the terminal rows with the upper surface 551A of the coupled portion 550A of the corresponding terminal 500A of the remaining one of the terminal rows in the width direction or couples the lower surface 452A of the coupled portion 450A of the terminal 400A of the one of the terminal rows with the lower surface 552A of the coupled portion 550A of the corresponding terminal 500A of the remaining one of the terminal rows in the width direction.

Referring to FIG. 22, in each of the contact structures 360A, the coupling portion 700A couples the coupled portion 450A of the terminal 400A with the coupled portion 550A of the terminal 500A in the direction perpendicular to the pitch direction. Specifically, in each of the contact structures 360A, the coupling portion 700A couples the coupled portion 450A of the terminal 400A with the coupled portion 550A of the terminal 500A in the width direction perpendicular to the pitch direction.

(Second Modification)

Figure 24:
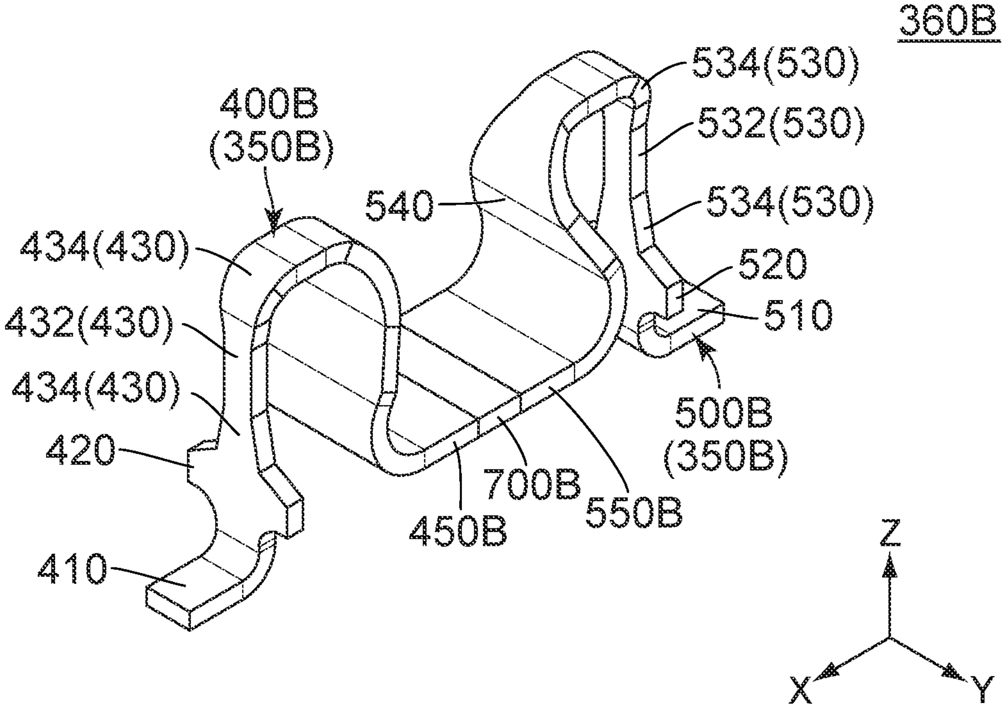
FIG. 24 is a perspective view showing a contact structure which is included in a second modification of the connector of FIG. 6.

Referring to FIGS. 6 and 24, a connector of a second modification (not shown) comprises a housing (not shown), a plurality of terminals 400B, 500B and a plurality of coupling portions 700B. The housing of the present modification has a structure same as that of the housing 200 of the aforementioned embodiment. Accordingly, detailed explanation thereabout is omitted.

Figure 25:
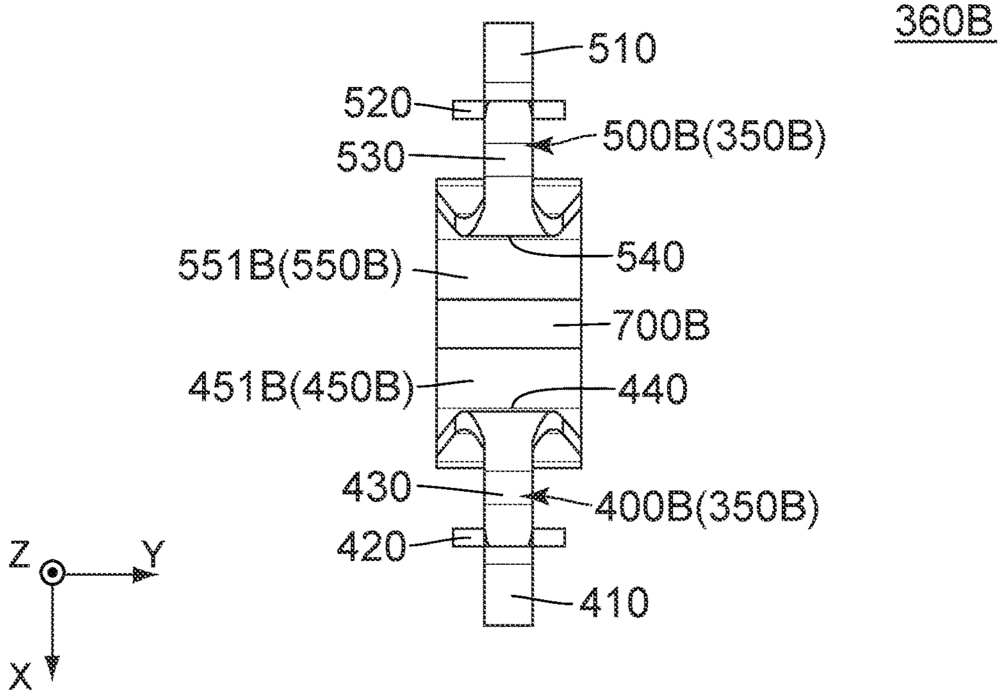
FIG. 25 is a top view showing the contact structure of FIG. 24.
Figure 26:
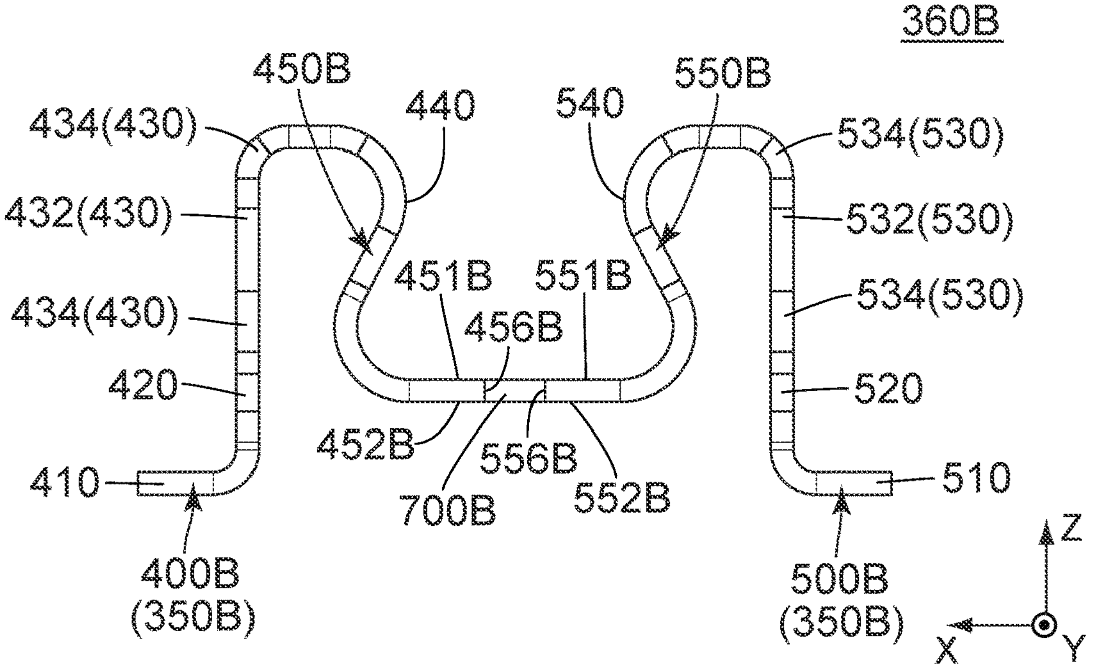
FIG. 26 is a side view showing the contact structure of FIG. 24.
Figure 27:
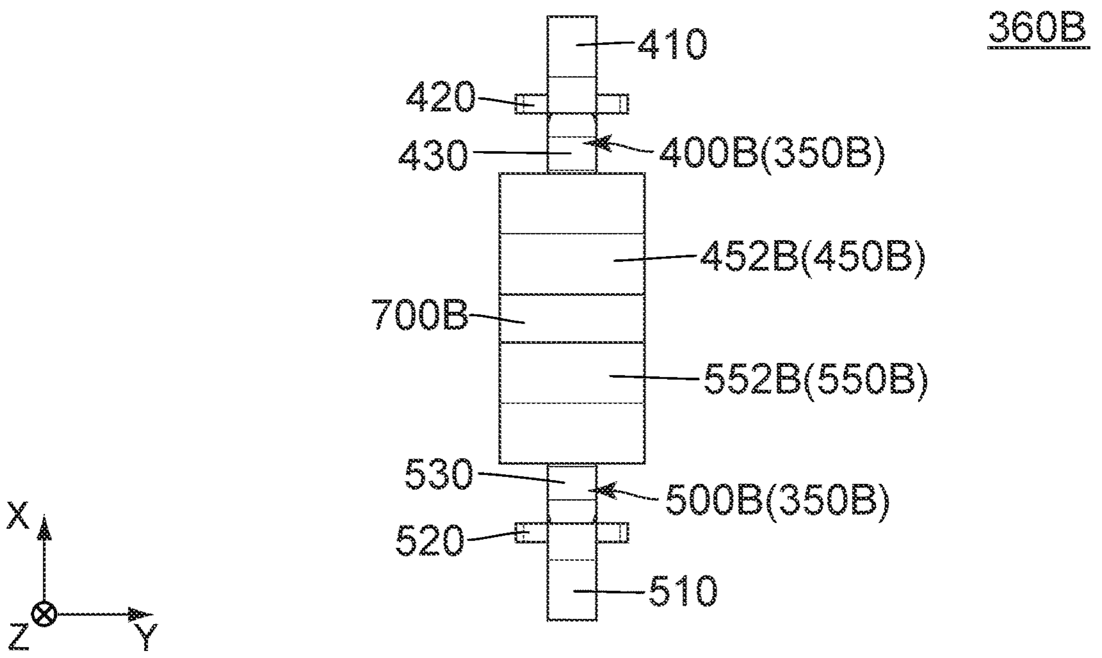
FIG. 27 is a bottom view showing the contact structure of FIG. 24.

Referring to FIG. 26, the terminals 400B, 500B of the present modification form two terminal rows (not shown). Specifically, the terminals 400B of the present modification form a terminal row (not shown) while the terminals 500B of the present modification form another terminal row (not shown). The two terminal rows are arranged in the width direction, or in the front-rear direction. The two terminal rows are respectively held by two side wall portions (not shown) of the housing. In each of the two terminal rows, the terminals 400B are arranged in the pitch direction perpendicular to the width direction while the terminals 500B are arranged in the pitch direction perpendicular to the width direction. The terminals 400B of one of the two terminal rows respectively correspond to the terminals 500B of a remaining one of the two terminal rows. The terminal 400B of the one of the terminal rows and the corresponding terminal 500B of the remaining one of the terminal rows form a terminal pair 350B. Referring to FIG. 25, in the pitch direction, the terminal 400B of the one of the terminal rows is positioned at a position same as a position of the corresponding terminal 500B of the remaining one of the terminal rows. That is, in each of the terminal pairs 350B, the two terminals 400B and 500B are positioned at the same position as each other in the pitch direction. The terminals 400B, 500B are respectively connected with mating terminals (not shown) of a mating connector (not shown) when the connector and the mating connector are mated with each other.

As shown in FIG. 26, each of the terminals 400B is manufactured by punching out a blank from a metal plate, followed by bending the blank. In other words, each of the terminals 400B has a uniform thickness. Each of the terminals 400B has a fixed portion 410, a press-fit portion 420, a supporting portion 430, a contact point 440 and a coupled portion 450B. The fixed portion 410, the press-fit portion 420, the supporting portion 430 and the contact point 440 of the present modification have structures same as those of the fixed portion 410, the press-fit portion 420, the supporting portion 430 and the contact point 440 of the aforementioned embodiment. Accordingly, detailed explanation thereabout is omitted.

As shown in FIG. 26, the coupled portion 450B of the present modification extends from the contact point 440. Specifically, the coupled portion 450B extends downward in the up-down direction and outward in the width direction from the contact point 440, and is bent so that it extends inward in the width direction. Specifically, the coupled portion 450B extends downward in the up-down direction and forward in the front-rear direction from the contact point 440, and is bent so that it extends rearward in the front-rear direction. The coupled portion 450B defines an inner end of the terminal 400B in the width direction. Specifically, the coupled portion 450B defines a rear end of the terminal 400B in the front-rear direction. Referring to FIGS. 24 and 25, in each of the terminals 400B, a size of the supporting portion 430 in the pitch direction is smaller than a size of the coupled portion 450B in the pitch direction.

As shown in FIG. 26, the coupled portion 450B has an upper surface 451B and a lower surface 452B in the up-down direction perpendicular to both the width direction and the pitch direction. Additionally, the coupled portion 450B has an end surface 456B in the width direction. The upper surface 451B, the lower surface 452B and the end surface 456B of the present modification have structures same as those of the upper surface 451, the lower surface 452 and the end surface 456 of the aforementioned embodiment. Accordingly, detailed explanation thereabout is omitted.

As shown in FIG. 26, the terminal 500B has the same shape as the terminal 400B. Each of the terminals 500B is manufactured by punching out a blank from a metal plate, followed by bending the blank. In other words, each of the terminals 500B has a uniform thickness. Each of the terminals 500B has a fixed portion 510, a press-fit portion 520, a supporting portion 530, a contact point 540 and a coupled portion 550B. The fixed portion 510, the press-fit portion 520, the supporting portion 530 and the contact point 540 of the present modification have structures same as those of the fixed portion 510, the press-fit portion 520, the supporting portion 530 and the contact point 540 of the aforementioned embodiment. Accordingly, detailed explanation thereabout is omitted.

As shown in FIG. 26, the coupled portion 550B of the present modification extends from the contact point 540. The coupled portion 550B extends downward in the up-down direction and outward in the width direction from the contact point 540, and is bent so that it extends inward in the width direction. Specifically, the coupled portion 550B extends downward in the up-down direction and rearward in the front-rear direction from the contact point 540, and is bent so that it extends forward in the front-rear direction. The coupled portion 550B defines an inner end of the terminal 500B in the width direction. Specifically, the coupled portion 550B defines a front end of the terminal 500B in the front-rear direction. Referring to FIGS. 24 and 25, in each of the terminals 500B, a size of the supporting portion 530 in the pitch direction is smaller than a size of the coupled portion 550B in the pitch direction.

Referring to FIG. 26, the coupled portion 450B of each of the terminals 400B of the one of the terminal rows is positioned away from the coupled portion 550B of the corresponding terminal 500B of the remaining one of the terminal rows in the width direction. The coupled portion 450B of each of the terminals 400B of the one of the terminal rows is positioned at a position same as a position of the coupled portion 550B of the corresponding terminal 500B of the remaining one of the terminal rows in the up-down direction. Referring to FIG. 25, the coupled portion 450B of each of the terminals 400B of the one of the terminal rows is positioned at a position same as a position of the coupled portion 550B of the corresponding terminal 500B of the remaining one of the terminal rows in the pitch direction.

Referring to FIG. 26, each of the coupling portions 700B of the present modification is made of insulator. The coupling portions 700B correspond to the terminal pairs 350B, respectively. The terminal pair 350B and the corresponding coupling portion 700B form a contact structure 360B. In the contact structure 360B of the present modification, the coupled portion 450B of the terminal 400B and the coupled portion 550B of the terminal 500B are positioned away from each other in the width direction. In the contact structure 360B, the coupled portion 450B of the terminal 400B and the coupled portion 550B of the terminal 500B are positioned at the same position as each other in the up-down direction. The contact structure 360B has a symmetrical shape with respect to a plane which is perpendicular to the width direction while passing through a middle of the contact structure 360B in the width direction. As shown in FIG. 25, in the contact structure 360B, the coupled portion 450B of the terminal 400B and the coupled portion 550B of the terminal 500B are positioned at the same position as each other in the pitch direction.

Referring to FIG. 26, each of the coupling portions 700B couples the coupled portion 450B of the terminal 400B of the one of the terminal rows with the coupled portion 550B of the corresponding terminal 500B of the remaining one of the terminal rows in a direction perpendicular to the pitch direction. In other words, the connector of the present modification is configured so that the coupled portion 450B of the terminal 400B of the one of the two terminal rows and the coupled portion 550B of the corresponding terminal 500B of the remaining one of the two terminal rows are coupled with each other by the coupling portion 700B, which is made of insulator, in the direction perpendicular to the pitch direction. This enables the connector of the present modification to be configured as follows: in a case where the mating connector is moved relative to the connector in the first orientation of the width direction under a mated state where the connector and the mating connector are mated with each other, ones of the mating terminals are pressed against ones of the terminals 400B, 500B corresponding thereto and belonging to the terminal row which is positioned at a first side of the connector in the first orientation; and, in this case, the others of the terminals 400B, 500B of the terminal row, which is positioned at a second side of the connector in the second orientation opposite to the first orientation of the width direction, are moved in the first orientation and thereby the contact between the others of the terminals 400B, 500B of the terminal row at the second side of the connector and the others of the mating terminals corresponding thereto is also maintained. In other words, the connector of the present modification can ensure reliable contact between the terminals 400B, 500B and the mating terminals when the mating connector is moved in the width direction relative to the connector under the mated state where the connector and the mating connector are mated with each other.

Referring to FIG. 26, each of the coupling portions 700B couples the coupled portion 450B of the terminal 400B of the one of the terminal rows with the coupled portion 550B of the corresponding terminal 500B of the remaining one of the terminal rows in the width direction. Each of the coupling portions 700B is sandwiched between the coupled portion 450B of the terminal 400B of the one of the terminal rows and the coupled portion 550B of the corresponding terminal 500B of the remaining one of the terminal rows in the width direction.

Referring to FIG. 26, the coupling portion 700B is coupled with both of the end surface 456B of the coupled portion 450B of the terminal 400B of the one of the terminal rows and the end surface 556B of the coupled portion 550B of the corresponding terminal 500B of the remaining one of the terminal rows.

Referring to FIG. 26, in each of the contact structures 360B, the coupling portion 700B couples the coupled portion 450B of the terminal 400B with the coupled portion 550B of the terminal 500B in the direction perpendicular to the pitch direction. Specifically, in each of the contact structures 360B, the coupling portion 700B couples the coupled portion 450B of the terminal 400B with the coupled portion 550B of the terminal 500B in the width direction perpendicular to the pitch direction.

(Third Modification)

Figure 28:
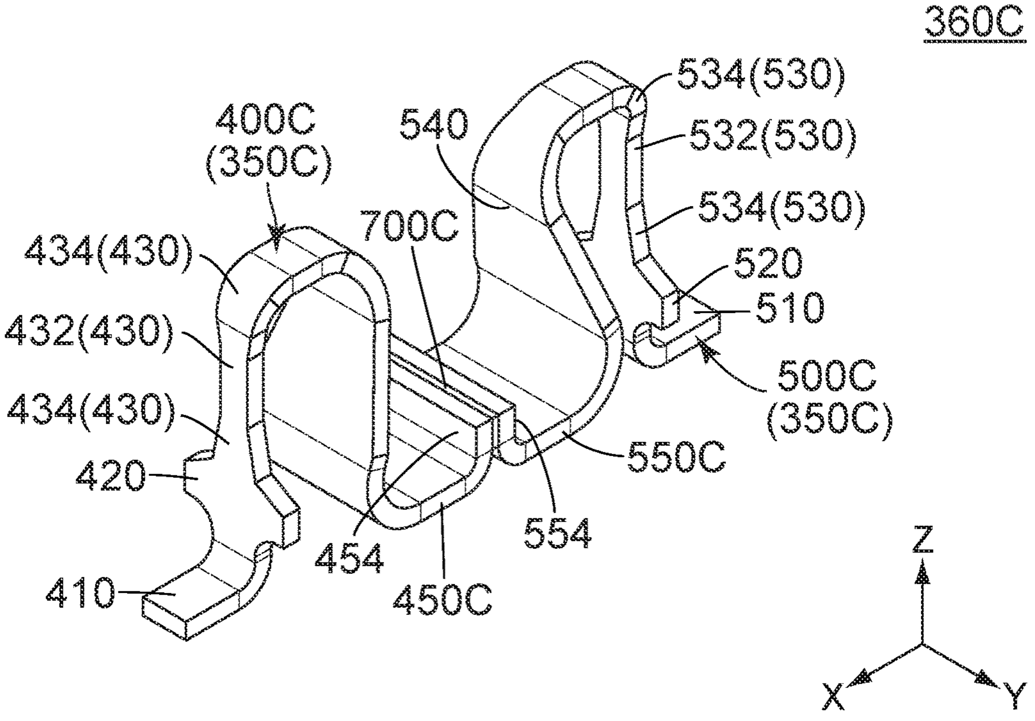
FIG. 28 is a perspective view showing a contact structure which is included in a third modification of the connector of FIG. 6.

Referring to FIGS. 6 and 28, a connector of a third modification (not shown) comprises a housing (not shown), a plurality of terminals 400C, 500C and a plurality of coupling portions 700C. The housing of the present modification has a structure same as that of the housing 200 of the aforementioned embodiment. Accordingly, detailed explanation thereabout is omitted.

Figure 29:
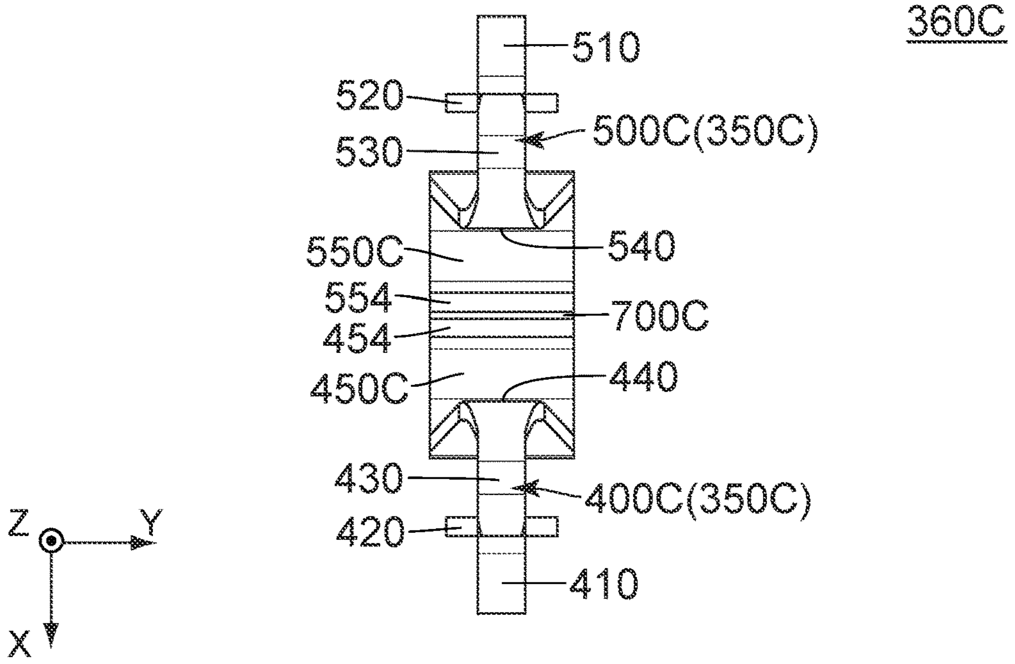
FIG. 29 is a top view showing the contact structure of FIG. 28.
Figure 30:
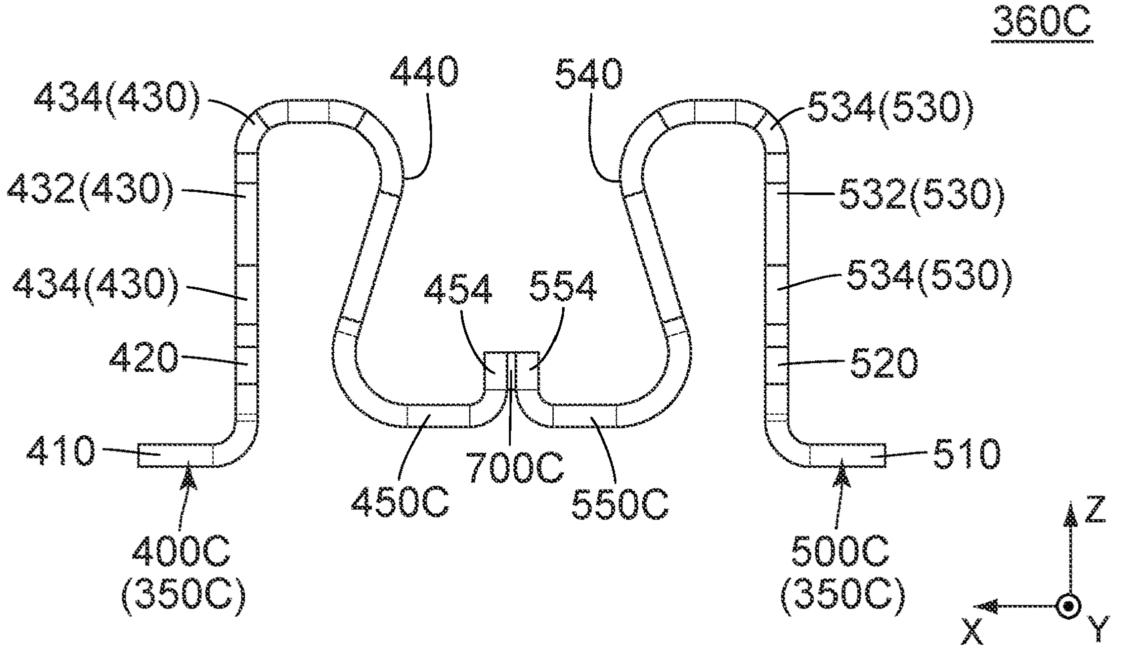
FIG. 30 is a side view showing the contact structure of FIG. 28.
Figure 31:
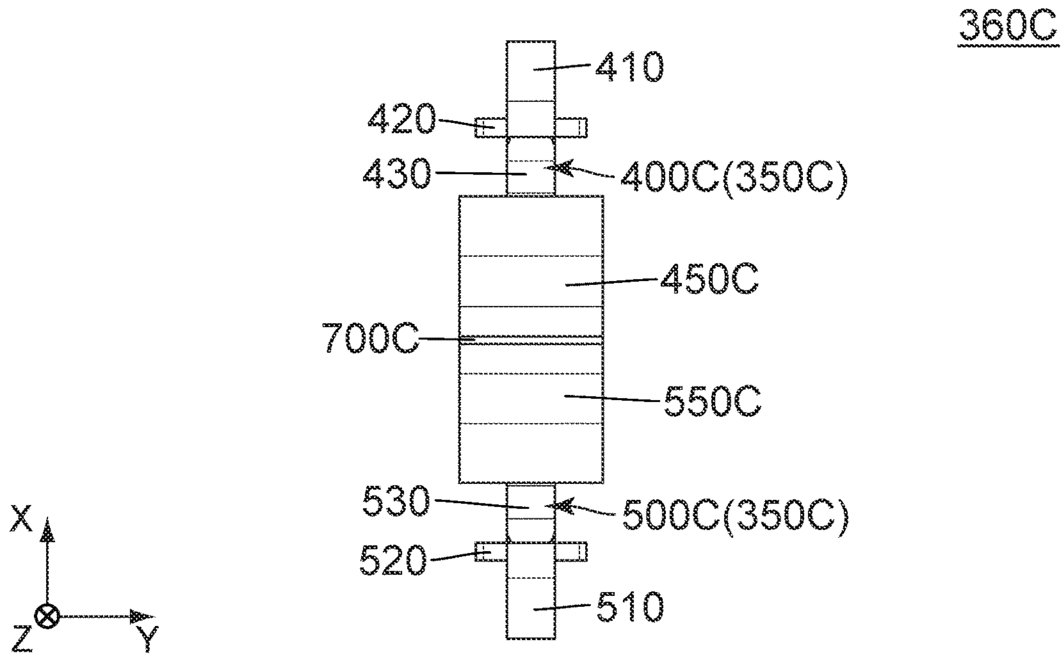
FIG. 31 is a bottom view showing the contact structure of FIG. 28.

Referring to FIG. 30, the terminals 400C, 500C of the present modification form two terminal rows (not shown). Specifically, the terminals 400C of the present modification form a terminal row (not shown) while the terminals 500C of the present modification form another terminal row (not shown). The two terminal rows are arranged in the width direction, or in the front-rear direction. The two terminal rows are respectively held by two side wall portions (not shown) of the housing. In each of the two terminal rows, the terminals 400C are arranged in the pitch direction perpendicular to the width direction while the terminals 500C are arranged in the pitch direction perpendicular to the width direction. The terminals 400C of one of the two terminal rows respectively correspond to the terminals 500C of a remaining one of the two terminal rows. The terminal 400C of the one of the terminal rows and the corresponding terminal 500C of the remaining one of the terminal rows form a terminal pair 350C. As shown in FIG. 29, in the pitch direction, the terminal 400C of the one of the terminal rows is positioned at a position same as a position of the corresponding terminal 500C of the remaining one of the terminal rows. That is, in each of the terminal pairs 350C, the two terminals 400C and 500C are positioned at the same position as each other in the pitch direction. The terminals 400C, 500C are respectively connected with mating terminals (not shown) of a mating connector (not shown) when the connector and the mating connector are mated with each other.

As shown in FIG. 30, each of the terminals 400C is manufactured by punching out a blank from a metal plate, followed by bending the blank. In other words, each of the terminals 400C has a uniform thickness. Each of the terminals 400C has a fixed portion 410, a press-fit portion 420, a supporting portion 430, a contact point 440 and a coupled portion 450C. The fixed portion 410, press-fit portion 420, the supporting portion 430 and the contact point 440 of the present modification have structures same as those of the fixed portion 410, the press-fit portion 420, the supporting portion 430 and the contact point 440 of the aforementioned embodiment. Accordingly, detailed explanation thereabout is omitted.

As shown in FIG. 30, the coupled portion 450C of the present modification extends from the contact point 440. In detail, the coupled portion 450C extends downward in the up-down direction and outward in the width direction from the contact point 440, and is bent so that it extends inward in the width direction, and is further bent so that it extends upward in the up-down direction. Specifically, the coupled portion 450C extends downward in the up-down direction and forward in the front-rear direction from the contact point 440, and is bent so that it extends rearward in the front-rear direction, and is further bent so that it extends upward in the up-down direction. The coupled portion 450C defines an inner end of the terminal 400C in the width direction. Specifically, the coupled portion 450C defines a rear end of the terminal 400C in the front-rear direction. Referring to FIGS. 28 and 29, in each of the terminals 400C, a size of the supporting portion 430 in the pitch direction is smaller than a size of the coupled portion 450C in the pitch direction.

As shown in FIG. 30, the coupled portion 450C of the present modification has a vertical portion 454.

As shown in FIG. 30, the vertical portion 454 of the present modification extends in the up-down direction perpendicular to both the width direction and the pitch direction. The vertical portion 454 defines the inner end of the terminal 400C in the width direction. Specifically, the vertical portion 454 defines the rear end of the terminal 400C in the front-rear direction.

As shown in FIG. 30, the terminal 500C has the same shape as the terminal 400C. Each of the terminals 500C is manufactured by punching out a blank from a metal plate, followed by bending the blank. In other words, each of the terminals 500C has a uniform thickness. Each of the terminals 500C has a fixed portion 510, a press-fit portion 520, a supporting portion 530, a contact point 540 and a coupled portion 550C. The fixed portion 510, the press-fit portion 520, the supporting portion 530 and the contact point 540 of the present modification have structures same as those of the fixed portion 510, the press-fit portion 520, the supporting portion 530 and the contact point 540 of the aforementioned embodiment. Accordingly, detailed explanation thereabout is omitted.

As shown in FIG. 30, the coupled portion 550C of the present modification extends from the contact point 540. The coupled portion 550C extends downward in the up-down direction and outward in the width direction from the contact point 540, and is bent so that it extends inward in the width direction, and is further bent so that it extends upward in the up-down direction. Specifically, the coupled portion 550C extends downward in the up-down direction and rearward in the front-rear direction from the contact point 540, and is bent so that it extends forward in the front-rear direction, and is further bent so that it extends upward in the up-down direction. The coupled portion 550C defines an inner end of the terminal 500C in the width direction. Specifically, the coupled portion 550C defines a front end of the terminal 500C in the front-rear direction. Referring to FIGS. 28 and 29, in each of the terminals 500C, a size of the supporting portion 530 in the pitch direction is smaller than a size of the coupled portion 550C in the pitch direction.

Referring to FIG. 30, the coupled portion 450C of each of the terminals 400C of the one of the terminal rows is positioned at a position same as a position of the coupled portion 550C of the corresponding terminal 500C of the remaining one of the terminal rows in the up-down direction. Referring to FIG. 29, the coupled portion 450C of each of the terminals 400C of the one of the terminal rows is positioned at a position same as a position of the coupled portion 550C of the corresponding terminal 500C of the remaining one of the terminal rows in the pitch direction.

As shown in FIG. 30, the coupled portion 550C of the present modification has a vertical portion 554.

As shown in FIG. 30, the vertical portion 554 of the present modification extends in the up-down direction perpendicular to both the width direction and the pitch direction. The vertical portion 554 defines the inner end of the terminal 500C in the width direction. Specifically, the vertical portion 554 defines the front end of the terminal 500C in the front-rear direction.

Referring to FIG. 30, each of the coupling portions 700C of the present modification is made of insulator. The coupling portions 700C correspond to the terminal pairs 350C, respectively. The terminal pair 350C and the corresponding coupling portion 700C form a contact structure 360C. In the contact structure 360C of the present modification, the coupled portion 450C of the terminal 400C and the coupled portion 550C of the terminal 500C are positioned away from each other in the width direction. Specifically, in the contact structure 360C, the vertical portion 454 of the terminal 400C and the vertical portion 554 of the terminal 500C are positioned away from each other in the width direction. In the contact structure 360C, the coupled portion 450C of the terminal 400C and the coupled portion 550C of the terminal 500C are positioned at the same position as each other in the up-down direction. Specifically, in the contact structure 360C, the vertical portion 454 of the terminal 400C and the vertical portion 554 of the terminal 500C are positioned at the same position as each other in the up-down direction. The contact structure 360C has a symmetrical shape with respect to a plane which is perpendicular to the width direction while passing through a middle of the contact structure 360C in the width direction. As shown in FIG. 29, in the contact structure 360C, the coupled portion 450C of the terminal 400C and the coupled portion 550C of the terminal 500C are positioned at the same position as each other in the pitch direction. Specifically, in the contact structure 360C, the vertical portion 454 of the terminal 400C and the vertical portion 554 of the terminal 500C are positioned at the same position as each other in the pitch direction.

Referring to FIG. 30, each of the coupling portions 700C is sandwiched between the coupled portion 450C of the terminal 400C of the one of the terminal rows and the coupled portion 550C of the corresponding terminal 500C of the remaining one of the terminal rows in the width direction. More specifically, each of the coupling portions 700C is sandwiched between the vertical portion 454 of the terminal 400C of the one of the terminal rows and the vertical portion 554 of the corresponding terminal 500C of the remaining one of the terminal rows in the width direction.

Referring to FIG. 30, each of the coupling portions 700C couples the coupled portion 450C of the terminal 400C of the one of the terminal rows with the coupled portion 550C of the corresponding terminal 500C of the remaining one of the terminal rows in a direction perpendicular to the pitch direction. Specifically, the connector of the present modification is configured so that the coupled portion 450C of the terminal 400C of the one of the two terminal rows and the coupled portion 550C of the corresponding terminal 500C of the remaining one of the two terminal rows are coupled with each other by the coupling portion 700C, which is made of insulator, in the direction perpendicular to the pitch direction. This enables the connector of the present modification to be configured as follows: in a case where the mating connector is moved relative to the connector in the first orientation of the width direction under a mated state where the connector and the mating connector are mated with each other, ones of the mating terminals are pressed against ones of the terminals 400C, 500C corresponding thereto and belonging to the terminal row which is positioned at a first side of the connector in the first orientation; and, in this case, the others of the terminals 400C, 500C of the terminal row, which is positioned at a second side of the connector in the second orientation opposite to the first orientation of the width direction, are moved in the first orientation and thereby the contact between the others of the terminals 400C, 500C of the terminal row at the second side of the connector and the others of the mating terminals corresponding thereto is also maintained. In other words, the connector of the present modification can ensure reliable contact between the terminals 400C, 500C and the mating terminals when the mating connector is moved in the width direction relative to the connector under the mated state where the connector and the mating connector are mated with each other.

Referring to FIG. 30, each of the coupling portions 700C couples the coupled portion 450C of the terminal 400C of the one of the terminal rows with the coupled portion 550C of the corresponding terminal 500C of the remaining one of the terminal rows in the width direction. More specifically, each of the coupling portions 700C couples the vertical portion 454 of the terminal 400C of the one of the terminal rows with the vertical portion 554 of the corresponding terminal 500C of the remaining one of the terminal rows in the width direction.

Referring to FIG. 30, in each of the contact structures 360C, the corresponding coupling portion 700C is sandwiched between the coupled portion 450C of the terminal 400C and the coupled portion 550C of the terminal 500C in the width direction. More specifically, in each of the contact structures 360C, the corresponding coupling portion 700C is sandwiched between the vertical portion 454 of the coupled portion 450C of the terminal 400C and the vertical portion 554 of the coupled portion 550C of the terminal 500C in the width direction. In each of the contact structures 360C, the coupling portion 700C couples the coupled portion 450C of the terminal 400C with the coupled portion 550C of the terminal 500C in the direction perpendicular to the pitch direction. Specifically, in each of the contact structures 360C, the coupling portion 700C couples the coupled portion 450C of the terminal 400C with the coupled portion 550C of the terminal 500C in the width direction perpendicular to the pitch direction. More in detail, in each of the contact structures 360C, the coupling portion 700C couples the vertical portion 454 of the coupled portion 450C of the terminal 400C with the vertical portion 554 of the coupled portion 550C of the terminal 500C in the width direction.

Although the specific explanation about the present invention is made above referring to the embodiments, the present invention is not limited thereto and is susceptible to various modifications and alternative forms. In addition, the above embodiments and variations may also be combined.

Although the connector 100 of the present embodiment is configured so that the coupled portions 450 of the terminal 400 and the coupled portions 550 of the terminal 500 are coupled with each other by the sheet-like coupling portion 700, the present invention is not limited thereto. Specifically, the coupled portions 450 and 550 may be coupled with each other by insert-molding both of the coupled portion 450 of the terminal 400 and the coupled portion 550 of the terminal 500 into a molded product so that the coupled portions 450 and 550 are put together while the coupled portion 450 of the terminal 400 and the coupled portion 550 of the terminal 500 are insulated from each other. In this case, the molded product functions as a coupling portion 700. Alternatively, the coupled portions 450 and 550 may be coupled with each other by press-fitting both of the coupled portion 450 of the terminal 400 and the coupled portion 550 of the terminal 500 into an insulative block made of resin. In this case, the insulative block made of resin functions as a coupling portion 700.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector comprising a housing, a plurality of terminals and a plurality of coupling portions, wherein:

the housing has two side wall portions and a connection portion;

the connection portion connects the two side wall portions with each other so as to maintain a constant distance between the two side wall portions in a width direction;
the terminals form two terminal rows;
the two terminal rows are held by the two side wall portions, respectively;
in each of the two terminal rows, the terminals are arranged in a pitch direction perpendicular to the width direction;
the terminals of one of the two terminal rows respectively correspond to the terminals of a remaining one of the two terminal rows;
each of the terminals has a press-fit portion, a supporting portion, a contact point and a coupled portion;
the press-fit portion is press-fit into the side wall portion;
the supporting portion extends from the press-fit portion;
the contact point is supported by the supporting portion;
the contact point of each of the terminals of the one of the terminal rows faces the contact point of the corresponding terminal of the remaining one of the terminal rows in the width direction;
the coupled portion extends from the contact point;
each of the coupling portions is made of insulator; and
each of the coupling portions couples the coupled portion of the terminal of the one of the terminal rows with the coupled portion of the corresponding terminal of the remaining one of the terminal rows in a direction perpendicular to the pitch direction.

2. The connector as recited in claim 1, wherein:
each of the coupling portions is sandwiched between the coupled portion of the terminal of the one of the terminal rows and the coupled portion of the corresponding terminal of the remaining one of the terminal rows in an up-down direction perpendicular to both the width direction and the pitch direction; and
each of the coupling portions couples the coupled portion of the terminal of the one of the terminal rows with the coupled portion of the corresponding terminal of the remaining one of the terminal rows in the up-down direction.

3. The connector as recited in claim 1, wherein:
the coupled portion has an upper surface and a lower surface in an up-down direction perpendicular to both the width direction and the pitch direction; and
each of the coupling portions couples the upper surface of the coupled portion of the terminal of the one of the terminal rows with the upper surface of the coupled portion of the corresponding terminal of the remaining one of the terminal rows in the width direction or couples the lower surface of the coupled portion of the terminal of the one of the terminal rows with the lower surface of the coupled portion of the corresponding terminal of the remaining one of the terminal rows in the width direction.

4. The connector as recited in claim 1, wherein:
each of the coupling portions is sandwiched between the coupled portion of the terminal of the one of the terminal rows and the coupled portion of the corresponding terminal of the remaining one of the terminal rows in the width direction; and
each of the coupling portions couples the coupled portion of the terminal of the one of the terminal rows with the coupled portion of the corresponding terminal of the remaining one of the terminal rows in the width direction.

5. The connector as recited in claim 4, wherein:
the coupled portion has a vertical portion;
the vertical portion extends in an up-down direction perpendicular to both the width direction and the pitch direction;
each of the coupling portions is sandwiched between the vertical portion of the terminal of the one of the terminal rows and the vertical portion of the corresponding terminal of the remaining one of the terminal rows in the width direction; and
each of the coupling portions couples the vertical portion of the terminal of the one of the terminal rows with the vertical portion of the corresponding terminal of the remaining one of the terminal rows in the width direction.

6. The connector as recited in claim 1, wherein, in each of the terminals, a size of the supporting portion in the pitch direction is smaller than a size of the coupled portion in the pitch direction.

7. The connector as recited in claim 6, wherein:
each of the side wall portions has a receiving portion; and
the receiving portion partially receives the supporting portion when the supporting portion is resiliently deformed.

8. The connector as recited in claim 6, wherein:
each of the terminals has a uniform thickness;
the supporting portion has a narrow portion and two wide portions;
in the pitch direction, a size of the narrow portion is smaller than a size of any of the wide portions; and
the narrow portion is nearer to the contact point than any of the wide portions is in the up-down direction.

* * * * *